United States Patent
Arai

(10) Patent No.: US 10,277,546 B2
(45) Date of Patent: Apr. 30, 2019

(54) INFORMATION PROCESSING SYSTEM, INFORMATION PROCESSING APPARATUS, AND STORAGE MEDIUM

(71) Applicant: Masaki Arai, Tokyo (JP)

(72) Inventor: Masaki Arai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 539 days.

(21) Appl. No.: 14/684,505

(22) Filed: Apr. 13, 2015

(65) Prior Publication Data

US 2015/0304254 A1 Oct. 22, 2015

(30) Foreign Application Priority Data

Apr. 18, 2014 (JP) .................................. 2014-086754

(51) Int. Cl.
*G06F 15/16* (2006.01)
*H04L 12/58* (2006.01)

(52) U.S. Cl.
CPC .............. *H04L 51/14* (2013.01); *H04L 51/04* (2013.01)

(58) Field of Classification Search
CPC ................................ H04L 51/14; H04L 51/04
USPC .................... 709/206, 204, 249, 203
See application file for complete search history.

(56) References Cited

U.S. PATENT DOCUMENTS

| 8,549,076 | B2 * | 10/2013 | Mizrahi | A63F 13/10 |
| | | | | 709/205 |
| 2009/0003576 | A1 * | 1/2009 | Singh | G06Q 10/107 |
| | | | | 379/202.01 |
| 2013/0189664 | A1 * | 7/2013 | Lee | G09B 5/14 |
| | | | | 434/308 |
| 2013/0238725 | A1 * | 9/2013 | Trinh | G06Q 10/101 |
| | | | | 709/206 |
| 2014/0280401 | A1 | 9/2014 | Arai | |
| 2015/0081845 | A1 | 3/2015 | Arai | |

FOREIGN PATENT DOCUMENTS

| JP | 2013-186769 | 9/2013 |
| JP | 2013-254275 | 12/2013 |

OTHER PUBLICATIONS

Office Action dated Feb. 13, 2018 issued with respect to the basic Japanese Patent Application No. 2014-086754.

* cited by examiner

*Primary Examiner* — Ario Etienne
*Assistant Examiner* — Sahera Halim
(74) *Attorney, Agent, or Firm* — IPUSA, PLLC

(57) ABSTRACT

An information processing system is implemented by an information processing apparatus and terminals connected to the information processing apparatus. The information processing system includes a destination determiner that determines a destination terminal of the terminals based on the right of a sender terminal of the terminals that has sent a message, a message generator that generates a message adapted for the destination terminal based on the message sent from the sender terminal, a transmitter that sends the message generated by the message generator to the destination terminal, and a display unit that is provided in each of the terminals and displays the message sent from the transmitter in a display format corresponding to the right of the each of the terminals.

10 Claims, 20 Drawing Sheets

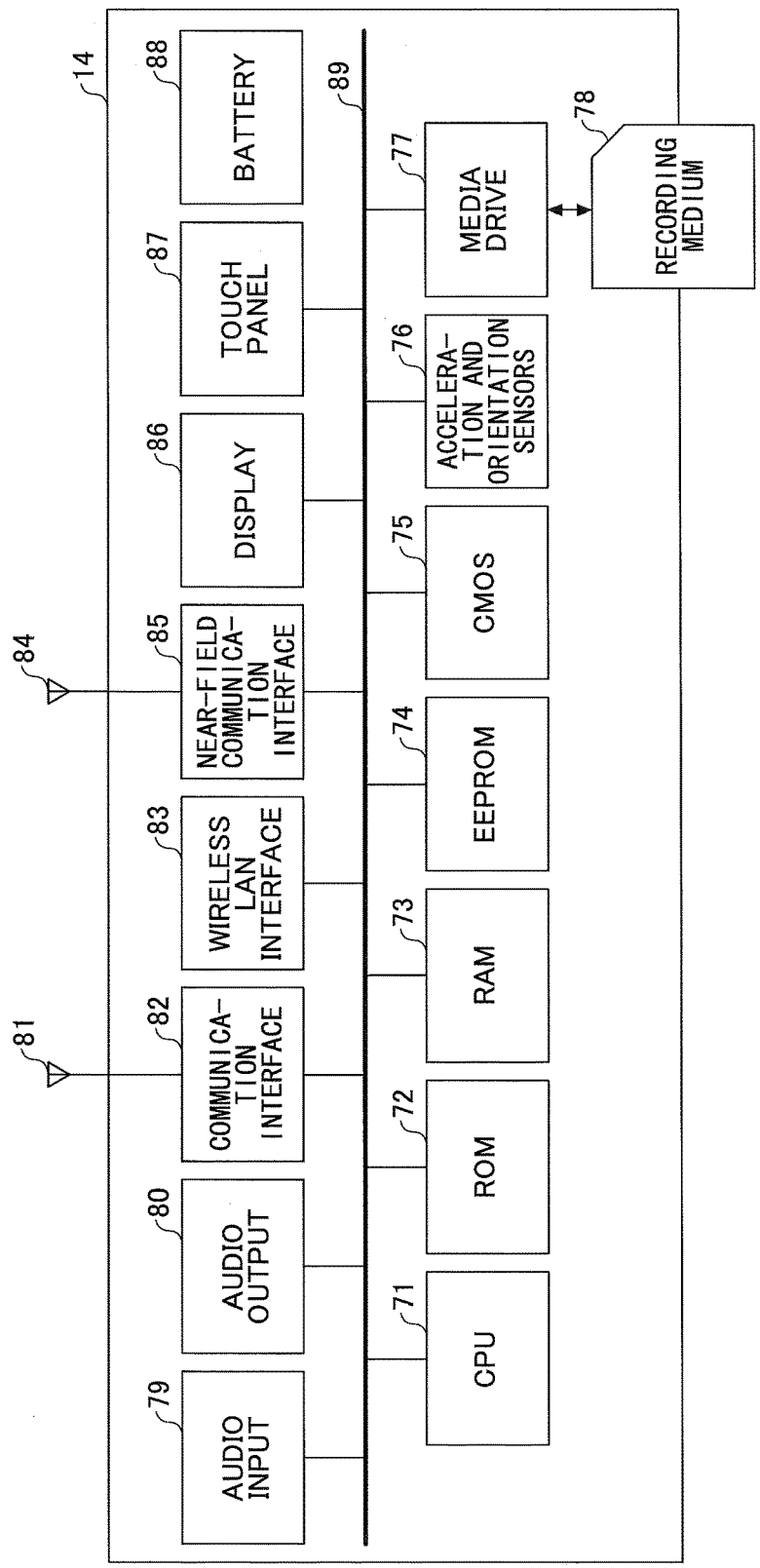

FIG.8A

| GROUP ID | USER NAME | RIGHTS |
|---|---|---|
| 0001 | A | PRESENTER |
| 0001 | B | LISTENER |
| 0001 | C | LISTENER |
| ... | ... | ... |

FIG.8B

| MESSAGE ID | SPEAKER | DESTINATION | GROUP ID | PAGE | MESSAGE |
|---|---|---|---|---|---|
| 1 | B | A | 0001 | 3 | COULD YOU TELL ME ABOUT ... |
| 2 | C | A | 0001 | 5 | COULD YOU TELL ME THE REASON WHY ...? |
| 3 | A | B | 0001 | 5 | [ANSWERING QUESTION FROM USER C] COULD YOU TELL ME THE REASON WHY ...? |
| 4 | A | C | 0001 | 5 | [LET ME ANSWER QUESTION FROM USER C] |
| ... | ... | ... | ... | ... | ... |

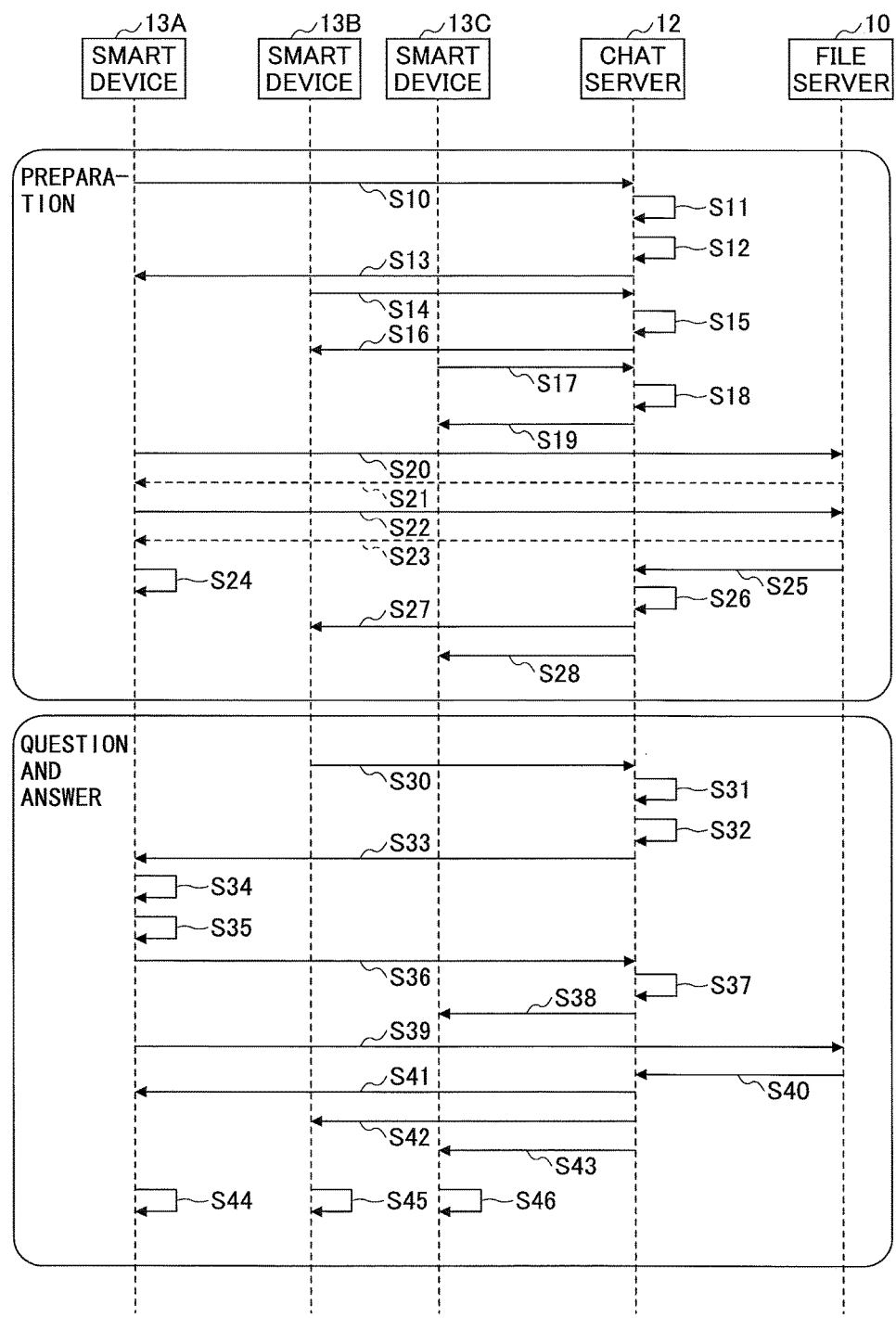

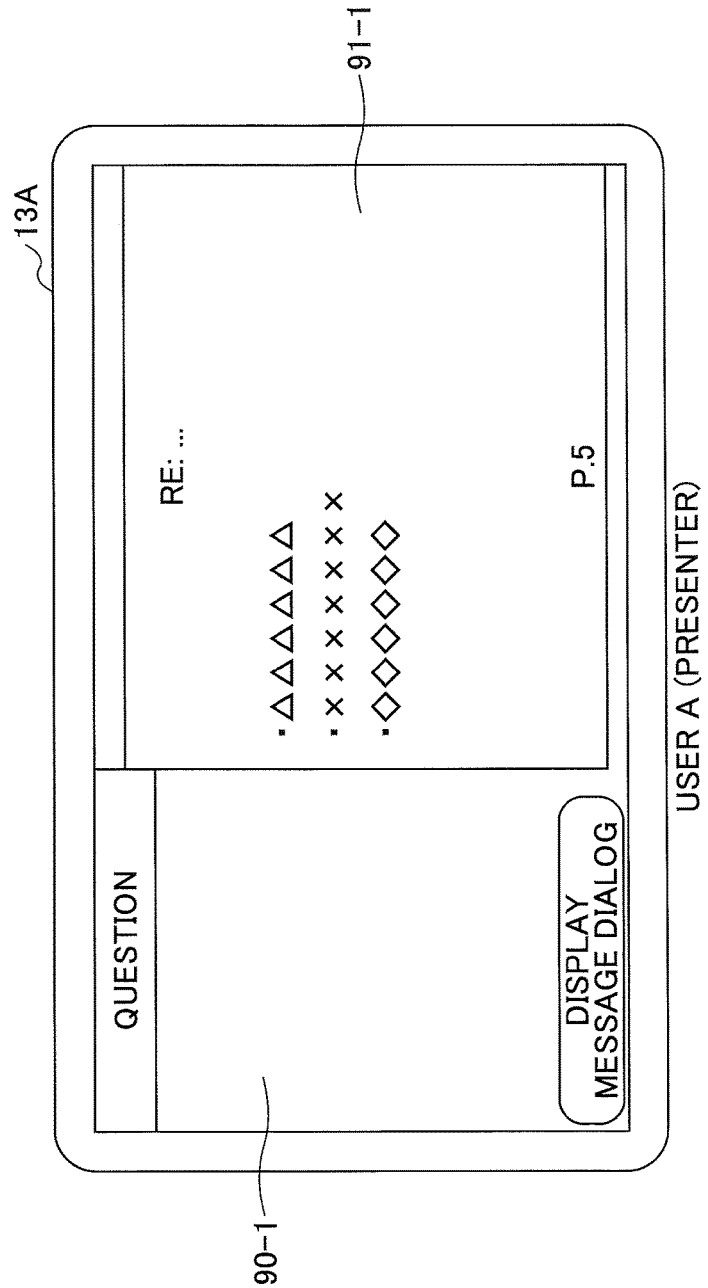

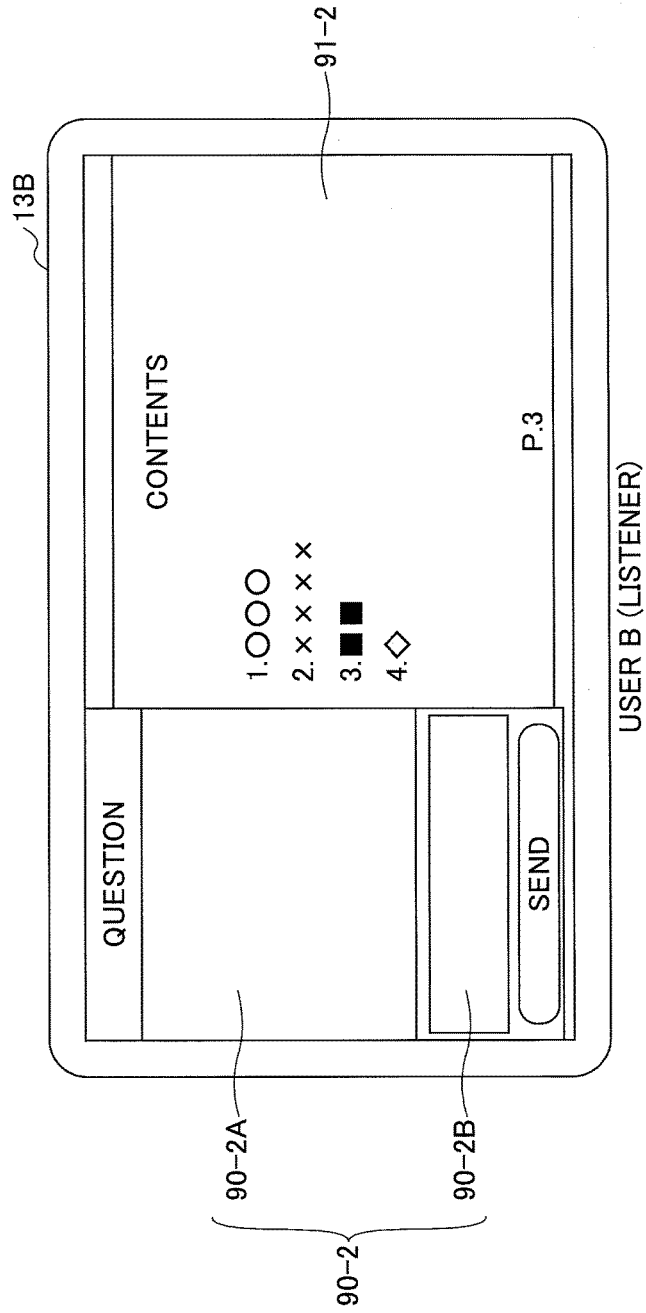

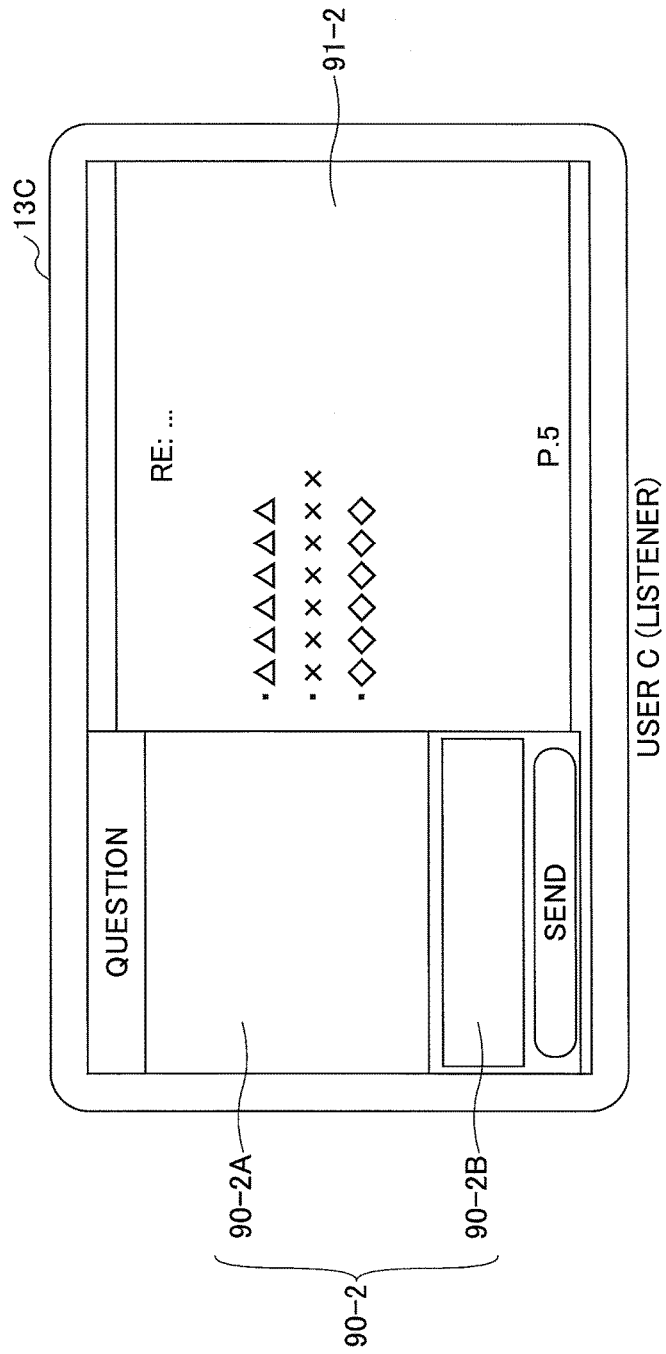

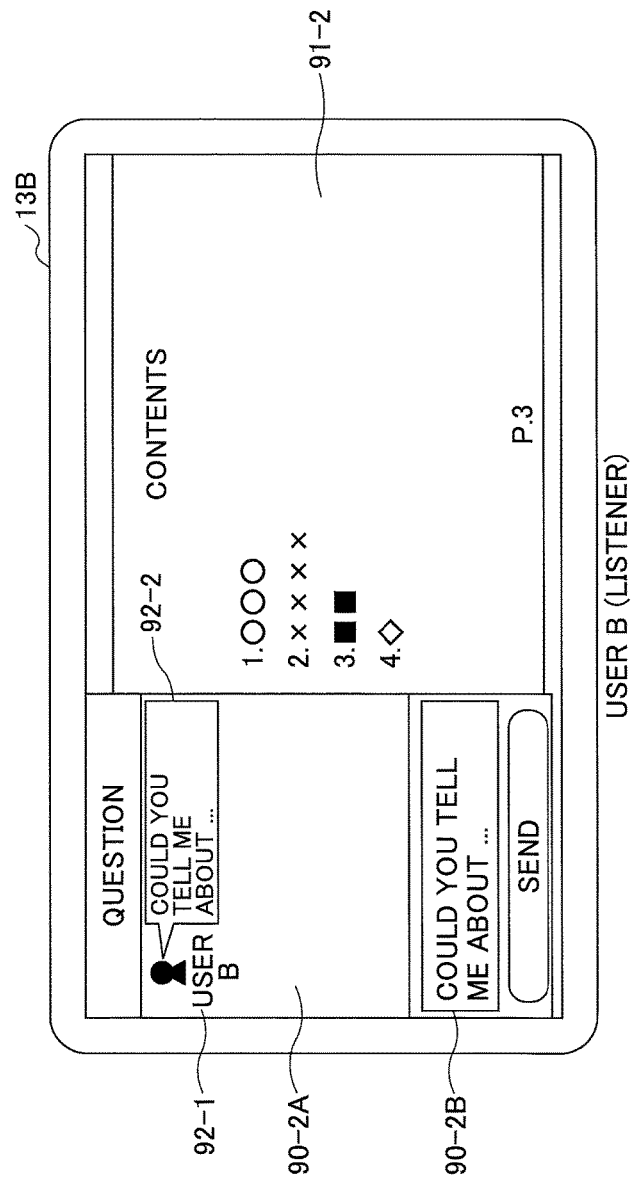

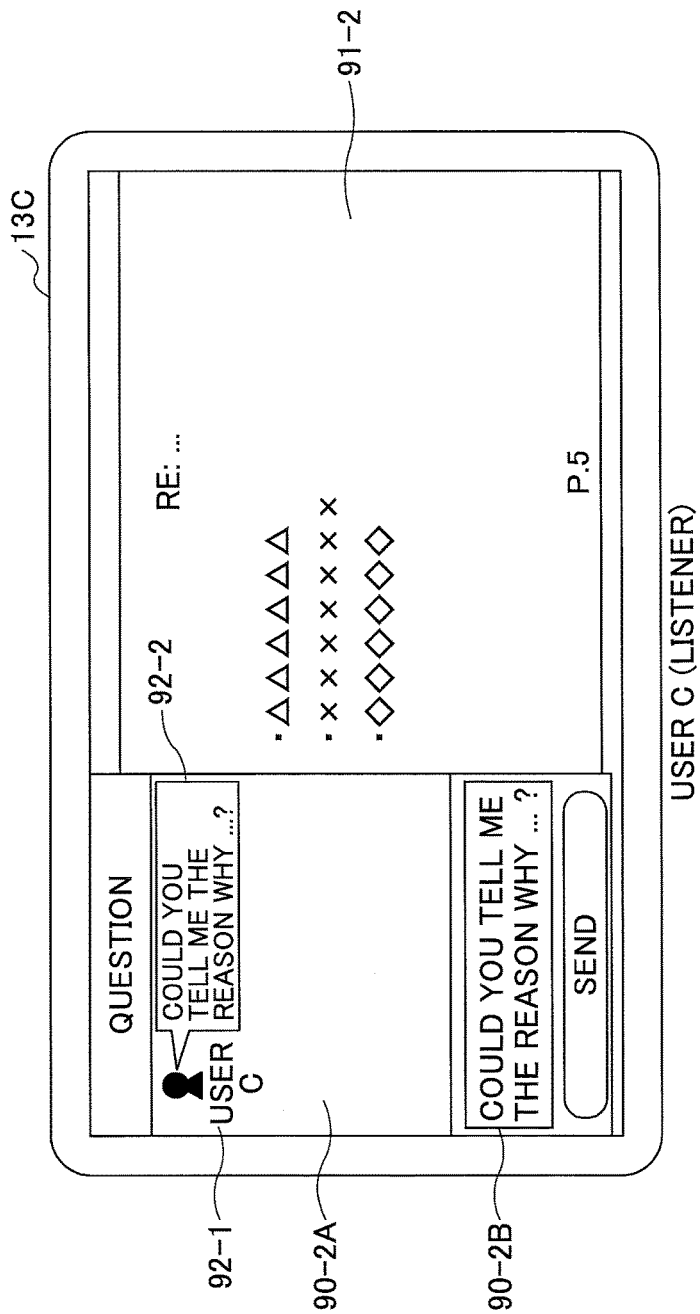

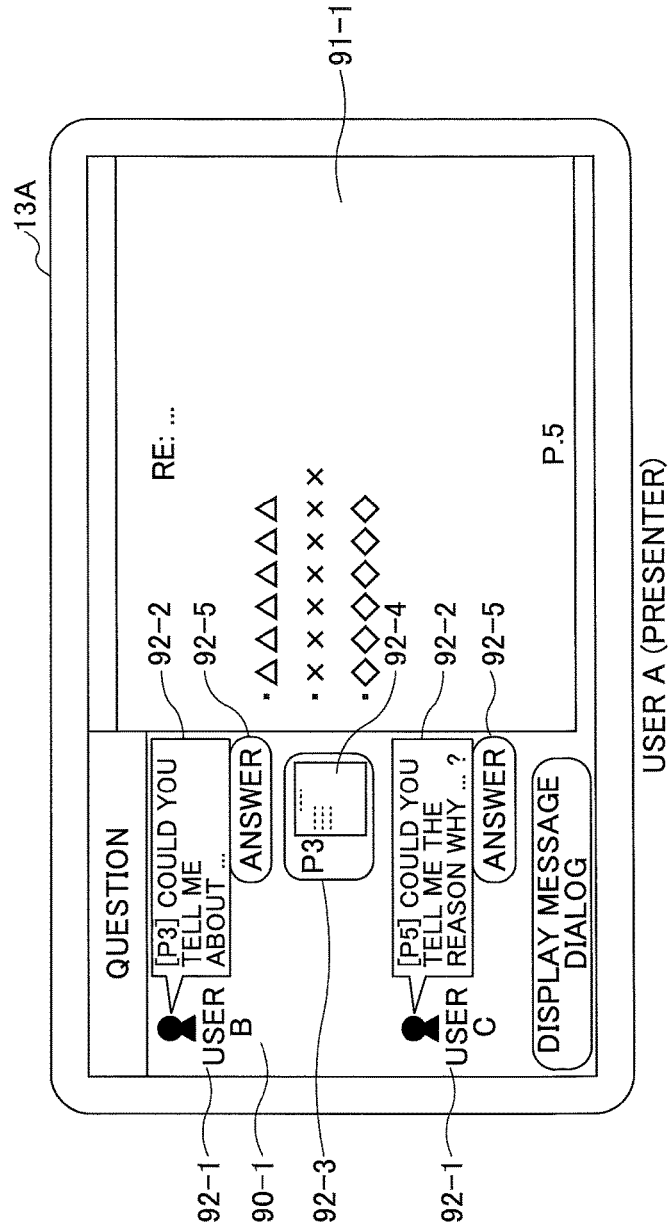

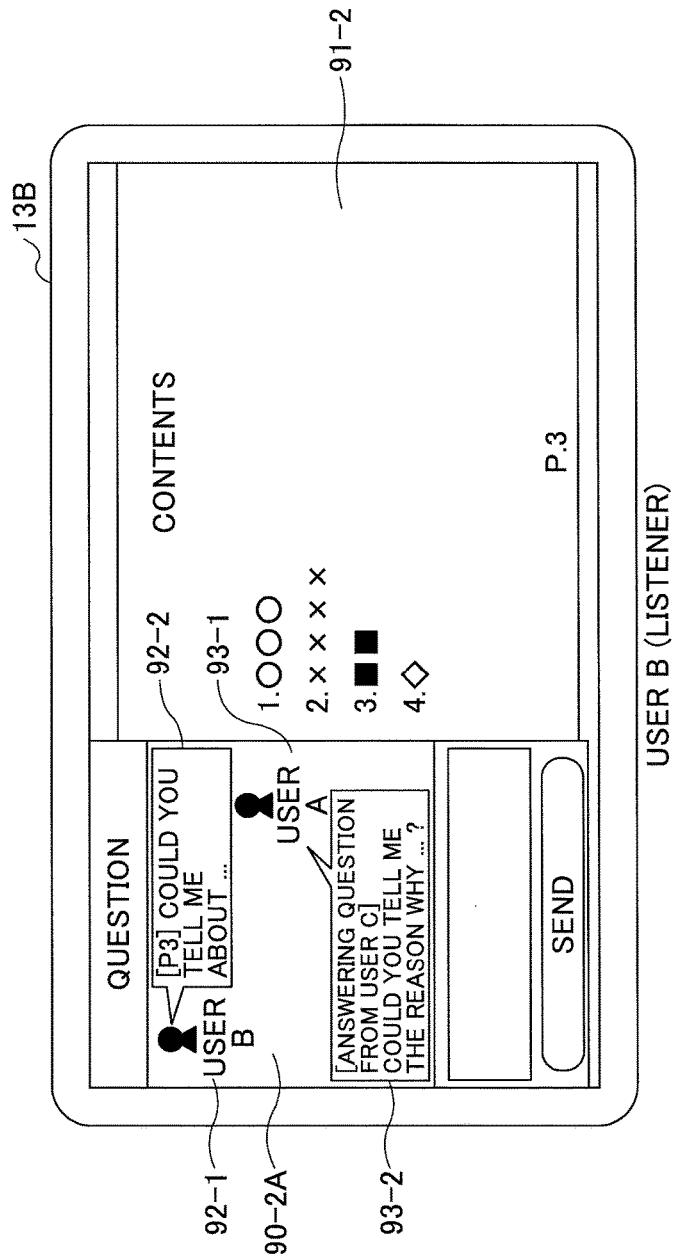

INFORMATION PROCESSING SYSTEM, INFORMATION PROCESSING APPARATUS, AND STORAGE MEDIUM

CROSS-REFERENCE TO RELATED APPLICATION

The present application is based upon and claims the benefit of priority of Japanese Patent Application No. 2014-086754, filed on Apr. 18, 2014, the entire contents of which are incorporated herein by reference.

BACKGROUND OF THE INVENTION

1. Field of the Invention

An aspect of this disclosure relates to an information processing system, an information processing apparatus, and a storage medium.

2. Description of the Related Art

There exist technologies that allow one or more smart devices (terminals) to display electronic files stored in a storage device on a network. For example, there exists a system where a presenter and listeners display an electronic file on their smart devices to perform and listen to a presentation or a lecture. Also, Japanese Laid-Open Patent Publication No. 2013-254275, for example, discloses a technology to be used for such a system to reduce the load of answering questions during a presentation. The disclosed technology makes it possible to display prepared answers in response to questions input by listeners, and to automatically search for a document related to a question and provide the document to a listener who has asked the question.

With the disclosed technology, however, it is not possible for a presenter to know what types of questions are asked by listeners during a presentation. Also with the disclosed technology, because listeners cannot freely ask questions to the presenter, it may become difficult for the listeners to follow a presentation. Further with the disclosed technology, a listener cannot know questions asked by other listeners and cannot know answers to the questions.

SUMMARY OF THE INVENTION

In an aspect of this disclosure, there is provided an information processing system implemented by an information processing apparatus and terminals connected to the information processing apparatus. The information processing system includes a destination determiner that determines a destination terminal of the terminals based on the right of a sender terminal of the terminals that has sent a message, a message generator that generates a message adapted for the destination terminal based on the message sent from the sender terminal, a transmitter that sends the message generated by the message generator to the destination terminal, and a display unit that is provided in each of the terminals and displays the message sent from the transmitter in a display format corresponding to the right of the each of the terminals.

BRIEF DESCRIPTION OF THE DRAWINGS

FIG. 7 is a block diagram illustrating an exemplary hardware configuration of a smart device;

FIGS. 8A and 8B are exemplary data tables stored in a chat server;

FIG. 9 is a sequence chart illustrating an exemplary preparation process and an exemplary question-and-answer process according to a first embodiment;

FIGS. 11A through 11C are drawings illustrating exemplary screens displayed on smart devices after log-in;

FIGS. 12A through 12C are drawings illustrating exemplary screens displayed on smart devices after questions are input;

FIGS. 13A through 13C are drawings illustrating exemplary screens displayed on smart devices after an answer notice is sent;

DESCRIPTION OF THE PREFERRED EMBODIMENTS

Embodiments of the present invention are described below with reference to the accompanying drawings.

<<System Configuration>>

Figure 1:
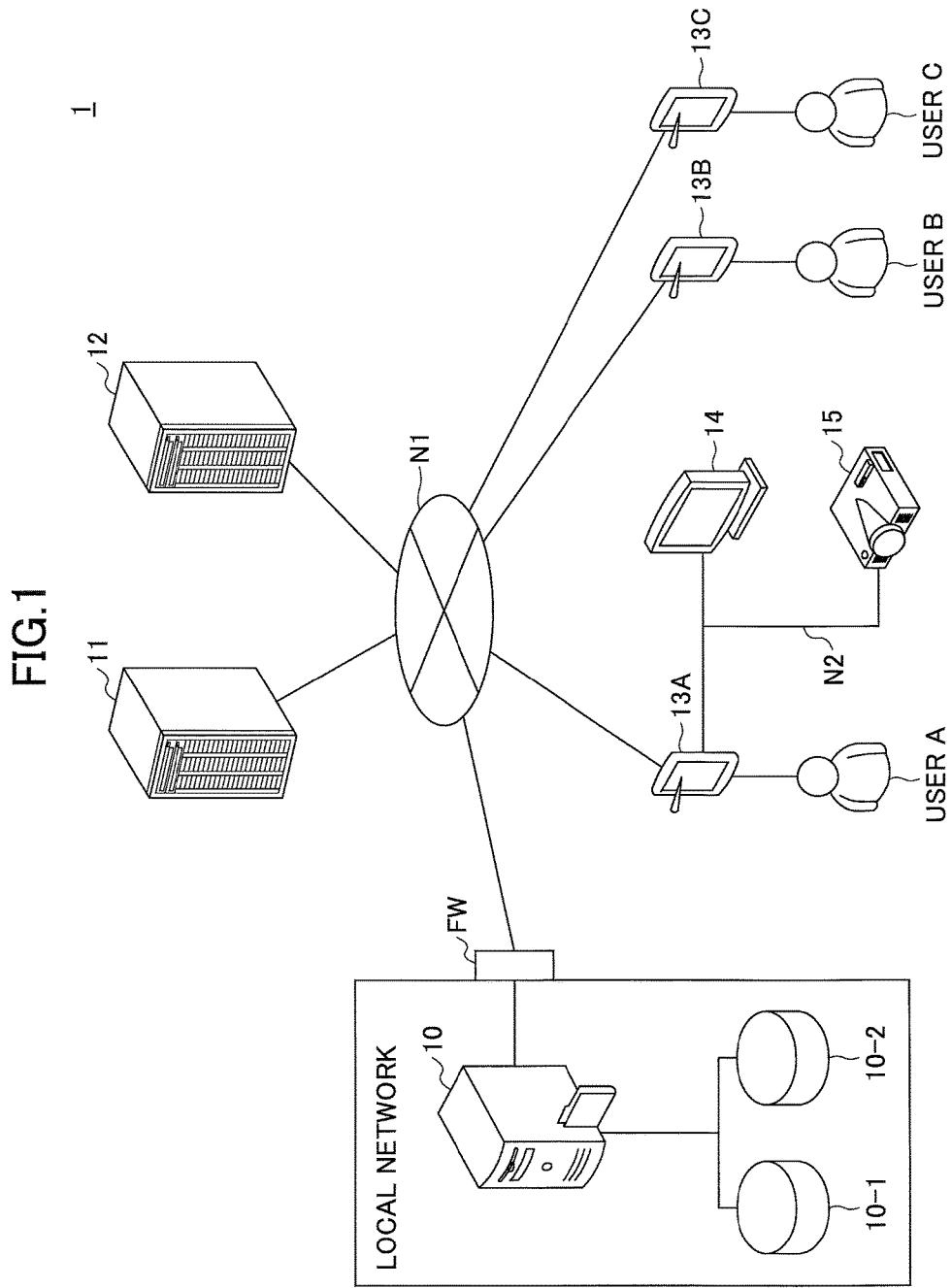
FIG. 1 is a drawing illustrating an exemplary configuration of an information processing system.

FIG. 1 is a drawing illustrating an exemplary configuration of an information processing system 1. As illustrated by FIG. 1, the information processing system 1 may include a file server 10, a relay server 11, a chat server 12, smart devices 13A through 13C (which may be collectively referred to as a smart device 13 or smart devices 13), a monitor 14, and a projector 15.

The file server 10 is an example of an information processing apparatus on, for example, a local network. The file server 10 is connected via a firewall (FW) to a communication network N1 such as a local area network LAN or the Internet.

The relay server 11, the chat server 12, and the smart devices 13 are connected to each other via the communication network N1 and can communicate with each other. In the example of FIG. 1, the smart device 13A, the monitor 14, and the projector 15 are connected to each other via a communication network N2 such as a LAN or the Internet.

The file server 10 stores user files 10-1 generated by users and chat logs 10-2 of conversations (messages) in real-time text-based conversation (chat) performed by users via the chat server 12. Here, a chat is not limited to a text-based conversation. For example, a chat may also be a conversation performed using images such as LINE stamps (registered trademark).

Because the file server 10 is connected via the firewall (FW) to the communication network N1, the relay server 11, the chat server 12, and the smart devices 13 cannot directly access the file server 10. On the other hand, the file server 10 can access the relay server 11, the chat server 12, and the smart devices 13. For example, the file server 10 can cause the relay server 11, the chat server 12, and the smart devices 13 to display a file in the user files 10-1.

The file server 10 receives requests from the chat server 12 and the smart devices 13 via the relay server 11. The file server 10 continuously queries the relay server 11 to determine whether any request and/or data has been received from any one of the chat server 12 and the smart devices 13. When a request and/or data has been received by the relay server 11, the file server 10 obtains the request and/or data from the relay server 11, and processes the request.

The file server 10 sends the result of processing the request to the relay server 11, and a corresponding one of the chat server 12 and the smart devices 13 (which has sent the request) receives the result of processing the request from the relay server 11.

The relay server 11 is an example of a relay apparatus that receives requests for the file server 10 from the chat server 12 and the smart devices 13, and relays the requests to the file server 10. The relay server 11 may also be configured to relay results of requested processes performed by the file server 10 to the chat server 12 and the smart devices 13.

When the file server 10, the chat server 12, and the smart devices 13 are in a closed network environment such as an intranet, the chat server 12 and the smart devices 13 can directly communicate with the file server 10 without using the relay server 11. In this case, the relay server 11 may be omitted from the information processing system 1.

The chat server 12 is an example of an information processing apparatus that receives, from a smart device 13, a message for a chat among the smart devices 13, and delivers the received message to other smart devices 13. For example, the chat server 12 manages messages for each group set by a user. In this case, the chat server 12 determines smart devices 13 to which a message is to be delivered based on rights of smart devices 13 belonging to the corresponding group.

The smart device 13 is an example of a user terminal. The smart device 13 may be implemented by any device that a user can operate. Examples of the smart devices 13 include a smartphone, a tablet terminal, a cell phone, and a notebook personal computer (PC). The smart devices 13 can chat with each other (or exchange messages) via the chat server 12.

The smart device 13 stores display screens such as chat screens corresponding to one or more preset rights. For example, when logging into the chat server 12, the smart device 13 selects and displays a chat screen corresponding to a right notified by the chat server 12. In the example of FIG. 1, the smart device 13A is used by a user A, the smart device 13B is used by a user B, and the smart device 13C is used by a user C.

The monitor 14 and the projector 15 display electronic files shared by the smart devices 13. In the example of FIG. 1, the monitor 14 and the projector 15 are connected to the smart device 13A, and are used to display a filed displayed on the smart device 13A.

The information processing system 1 of FIG. 1 may be used, for example, for presentations and lectures. For example, the smart device 13A may be used by a presenter or a lecturer, and the smart devices 13B and 13C may be used by listeners or students.

The chat server 12, for example, selects destination smart devices 13 to which a message is to be delivered from among the smart devices 13A through 13C involved in a message exchange (e.g., a chat), based on the right (e.g., presenter or listener) of a smart device 13 that has sent the message. Also, the chat server 12 generates messages adapted for the selected destination smart devices 13 based on the sent message, and delivers the generated messages to the destination smart devices 13. Each of the smart devices 13A through 13C displays a delivered message in a display format corresponding to its own right.

The configuration of the information processing system 1 may be modified according to, for example, its use or purpose. For example, the file server 10, the relay server 11, and the chat server 12 may be integrated into one computer, or each of the file server 10, the relay server 11, and the chat server 12 may be implemented by multiple computers (i.e., distributed to multiple computers). Also, each of the file server 10, the relay server 11, and the chat server 12 may be implemented as a cloud server in a cloud computing system consisting of one or more information processing apparatuses.

<<Functional Configuration>>
<File Server>

Figure 2:
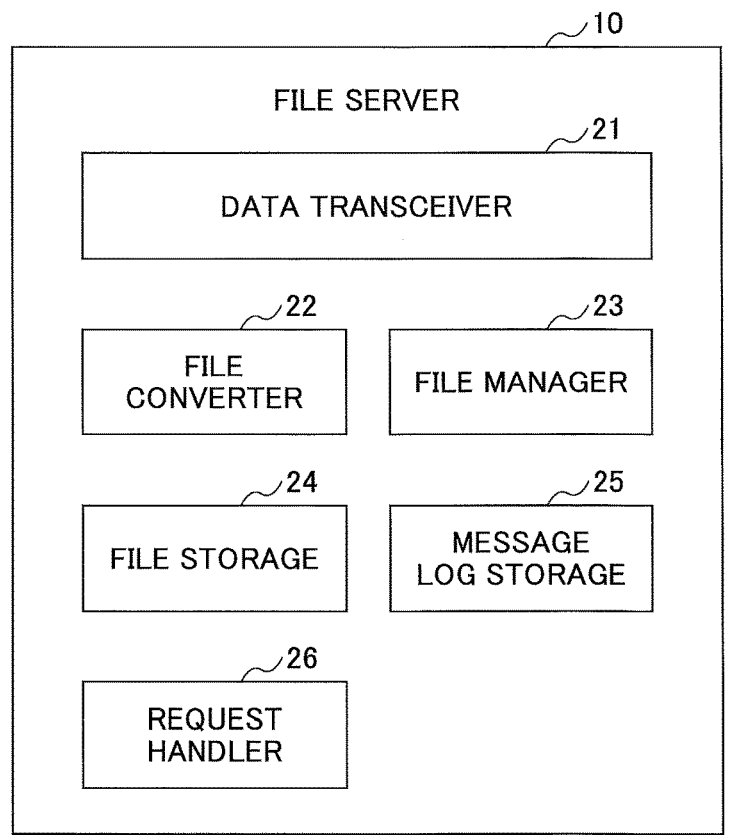
FIG. 2 is a block diagram illustrating an exemplary functional configuration of a file server.

FIG. 2 is a block diagram illustrating an exemplary functional configuration of the file server 10. As illustrated by FIG. 2, the file server 10 may include a data transceiver 21, a file converter 22, a file manager 23, a file storage 24, a message log storage 25, and a request handler 26. The data transceiver 21, the file converter 22, the file manager 23, the file storage 24, the message log storage 25, and the request handler may be implemented by executing a program by a processor of the file server 10.

The data transceiver 21 receives data such as electronic files, logs of chat messages, and requests from the chat server 12 and the smart devices 13. The data transceiver 21 also sends data such as electronic files and results of processing requests to the chat server 12 and the smart devices 13.

The file converter 22, for example, converts electronic files stored in the file storage 24 into file formats that can be displayed by the smart devices 13, the monitor 14, and the projector 15, and converts audio data into text data.

The file manager 23 manages attribute information (e.g., the number of pages and the size) of files stored in the file storage 24. The file storage 24, for example, stores files obtained from the smart devices 13 and reads the stored files. The file storage 24 may correspond to the user files 10-1 in FIG. 1.

The message log storage 25 stores logs of chat messages. Also, the message log storage 25 may be configured to generate, for example, the minutes of a chat based on the stored logs by putting together questions and answers made between a presenter and listeners in the chat. The message log storage 25 may correspond to the chat logs 10-2 in FIG. 1. The request handler 26 queries the relay server 11 for a request, and performs a process according to the request.

<Relay Server>

Figure 3:
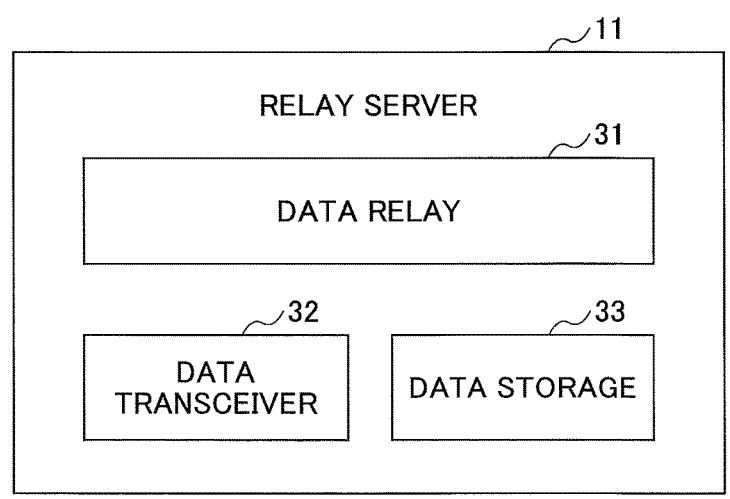
FIG. 3 is a block diagram illustrating an exemplary functional configuration of a relay server.

FIG. 3 is a block diagram illustrating an exemplary functional configuration of the relay server 11. As illustrated by FIG. 3, the relay server 11 may include a data relay 31, a data transceiver 32, and a data storage 33. The data relay 31, the data transceiver 32, and the data storage 33 may be implemented by executing a program by a processor of the relay server 11.

The data relay 31 determines one or more of the file server 10, the chat server 12, and the smart devices as destinations to which data received by the data transceiver 32 is to be relayed As a non-limiting example, the destinations may be determined based on sender information and/or destination information (e.g., addresses) included in the received data.

The data transceiver 32 receives requests and data from the file server 10, the chat server 12, and the smart devices 13, and sends processing results of the file server 10 and data to destinations determined by the data relay 31.

The data storage 33 stores various requests and data sent and received by the data transceiver 32 in association with, for example, sender information and/or destination information. The data storage 33 may also be configured to store requests and data in association with date and time information.

<Chat Server>

Figure 4:
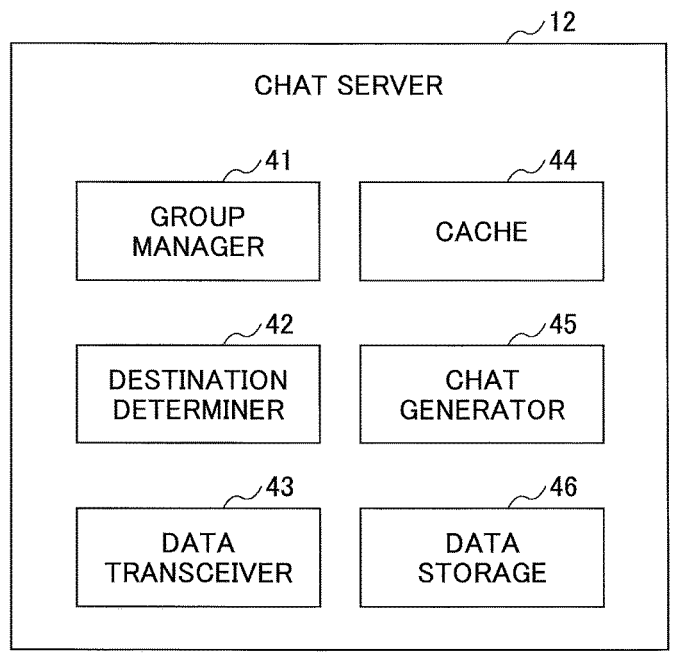
FIG. 4 is a block diagram illustrating an exemplary functional configuration of a chat server.

FIG. 4 is a block diagram illustrating an exemplary functional configuration of the chat server 12. As illustrated by FIG. 4, the chat server 12 may include a group manager 41, a destination determiner 42, a data transceiver 43, a cache 44, a chat generator (message generator) 45, and a data storage 46. The group manager 41, the destination determiner 42, the data transceiver 43, the cache 44, the chat generator 45, and the data storage 46 may be implemented by executing an application program (first application) by a processor of the chat server 12.

The group manager 41 manages, for example, users (in the example of FIG. 1, the smart devices 13A through 13C) participating in a chat, and a group (e.g., a chat group) of users to which a chat message is to be sent. A group may be generated by using, for example, one of the smart devices 13A through 13C. It is also possible to change a generated group. For example, a group may be generated to include a presenter and listeners participating in a presentation. Also, a group may be generated to include a lecturer and students participating in a lecture. Any other type of group may also be generated.

The destination determiner 42 determines destinations to which a chat message received by the data transceiver 43 is to be delivered, based on the right of a user (smart device 13) that has sent the chat message. For example, the destination determiner 42 determines destinations of a chat message based on a right such as "presenter (lecturer)" or "listener (student)" given to a user belonging to a group.

The present embodiment enables a listener (as a questioner) to ask a question about, for example, a presentation and enables a presenter (as an answerer) to answer the question, by using chat messages. The chat messages are also displayed on chat screens of listeners other than the questioner. The present embodiment also enables a presenter (as a questioner) to ask a question to a listener, and enables the listener (as an answerer) to answer the question. The presenter and the answerer may be either the same user or different users.

For example, when a user sending a chat message has a "questioner" right, the destination determiner 42 determines a user having an "answerer" right as the destination of the chat message. As another example, when to user sending a chat message has an "answerer" right, the destination determiner 42 determines other users belonging to the same group as the answerer (e.g., a user having a "questioner" right and users with listener rights other than "questioner") as the destinations of the chat message.

The data transceiver 43 receives data such as chat messages, and sends messages generated by the chat generator 45 and text data obtained by converting audio data to destinations determined by the destination determiner 42. The cache 44 temporarily stores chat messages received by the data transceiver 43.

The chat generator 45 obtains chat messages, which are received by the data transceiver 43, from the cache 44, and generates messages adapted for destinations determined by the destination determiner 42. For example, for a questioner, the chat generator 45 generates a message indicating that an answerer will answer a question. On the other hand, for listeners other than the questioner, the chat generator 45 generates a question message indicating the question asked by the questioner and a message indicating that the answerer will answer the question.

The data storage 46 stores, for example, a group management table and a message management table described later. For example, in a message management table, the data storage 46 stores sender information, destination information, and page information (page number) of messages received by the data transceiver 43 in association with messages generated by the chat generator 45. The data storage 46 may be configured to also store group information (group IDs) in association with the above information items.

<Smart Device>

Figure 5:
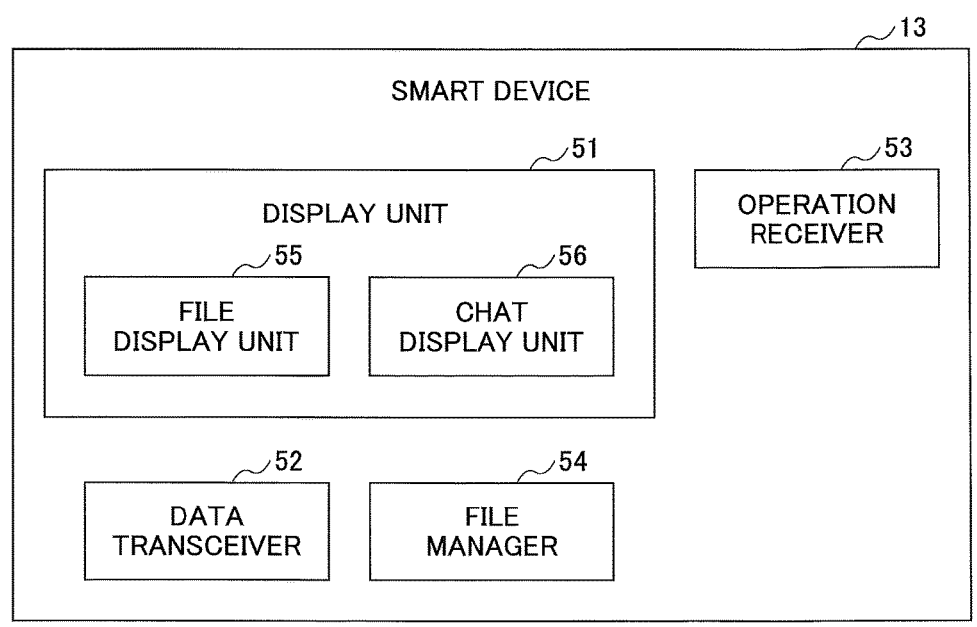
FIG. 5 is a block diagram illustrating an exemplary functional configuration of a smart device.

FIG. 5 is a block diagram illustrating an exemplary functional configuration of the smart device 13. As illustrated by FIG. 5, the smart device 13 may include a display unit 51, a data transceiver 52, an operation receiver 53, and a file manager 54, and exchanges messages with other smart devices 13 via the chat server 12.

The display unit 51, the data transceiver 52, the operation receiver 53, and the file manager 54 may be implemented by executing an application program (second application) by a processor of the smart device 13.

The display unit 51 includes a file display unit 55 for displaying files and a chat display unit 56 for displaying chat messages in a display format corresponding to the right of the smart device 13.

The file display unit 55 displays, for example, a shared file (electronic file) that is shared and viewed by the smart devices 13 in the same group (chat group). For example, when page information of an electronic file being displayed by the smart device 13 of a presenter is received from the chat server 12 during a presentation, the file display unit 55 displays a page of the electronic file corresponding to the page information. The file display unit 55 can also display other pages of the electronic file or other electronic files according to user operations.

The chat display unit 56 retains chat screens corresponding to rights (e.g., presenter and listener) of a user (the smart device 13) that are set in advance for a chat group. For example, the chat display unit 56 displays a chat screen corresponding to a right that is notified by the chat server 12 when the smart device 13 logs into the chat server 12. Thus, the chat display unit 56 can display different chat screens depending on whether the user is a presenter (answerer) or a listener (questioner or any other listener).

The chat display unit 56 also displays messages sent from the chat server 12 on the chat screen. The chat server 12 generates and sends messages adapted for respective destination smart devices 13 (i.e., rights of users). Therefore, different messages corresponding to the rights of users can be displayed on the chat screens of different smart devices 13.

For example, the above configuration makes it possible to display a question message from a questioner on a chat screen of a presenter (answerer), and to display an answer message from the presenter and/or the question message on chat screens of the questioner and listeners other than the questioner. Thus, the above configuration makes it possible to smoothly perform interactive communications in a defined group.

In the present embodiment, the chat display unit 56 of the display unit 51 displays a message on the same screen where a file is displayed by the file display unit 55. For example, this configuration makes it possible to display text messages regarding questions and answers during a presentation on the same screen where a file used for the presentation is displayed.

This in turn enables listeners and a presenter to smoothly ask questions and answer the questions based on information displayed by the display unit 51. Also, as described above, the display unit 51 can change display formats according to the right of the smart device 13 in a group.

The data transceiver 52 receives data such as electronic files and chat messages used in a presentation or a lecture, and sends the status of use of files and chat messages.

The operation receiver 53 receives user operations performed on the smart device 13. Based on user operations received by the operation receiver 53, the smart device 13, for example, generates a group on the chat server 12, logs into the chat server 12, and inputs text information for a chat.

The file manager 54, for example, stores files obtained from the file server 10 and used for a presentation or a lecture, and manages page information (e.g., the number of pages and the number of lines) of a file being displayed by the file display unit 55.

<<Hardware Configuration>>
<Computer System>

Figure 6:
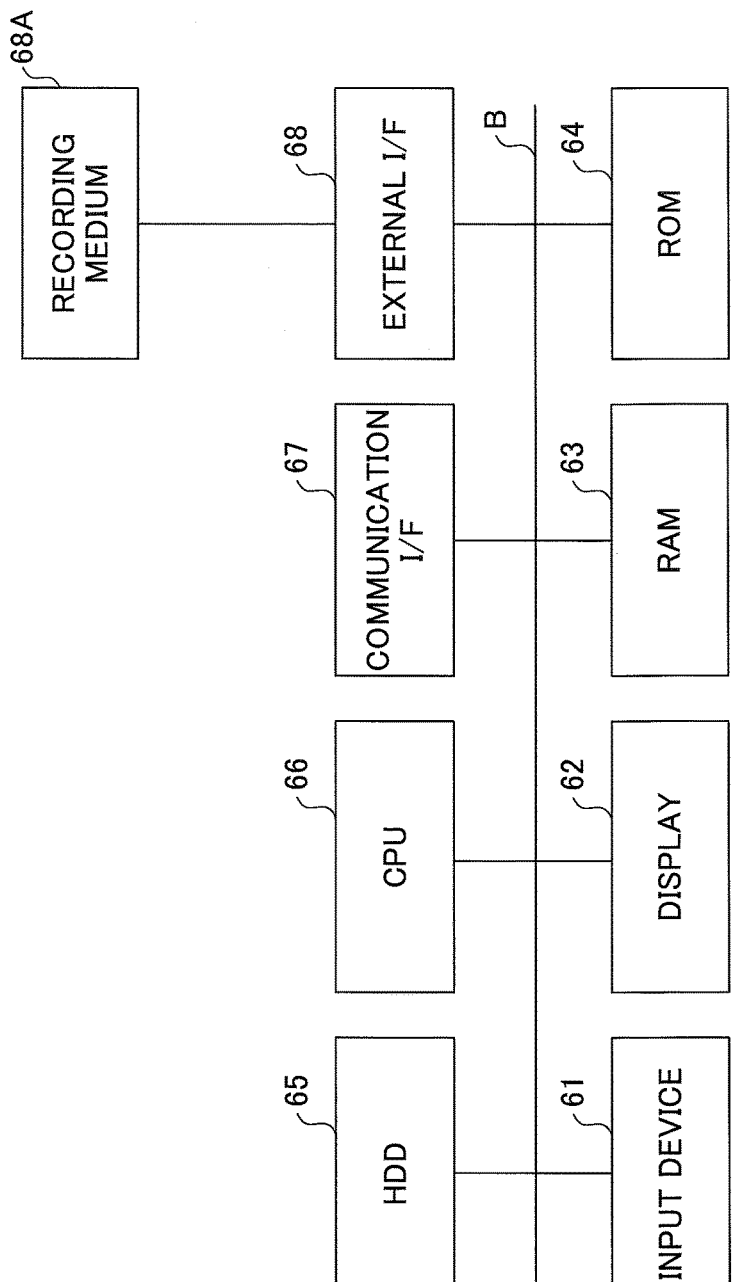
FIG. 6 is a block diagram illustrating an exemplary hardware configuration of a computer system.

Each of the file server 10, the relay server 11, and the chat server 12 may be implemented, for example, by a computer system with a hardware configuration as illustrated by FIG. 6.

FIG. 6 is a block diagram illustrating an exemplary hardware configuration of a computer system 2. As illustrated by FIG. 6, the computer system 2 may include an input device 61, a display 62, a random access memory (RAM) 63, a read-only memory (ROM) 64, a hard disk drive (HDD) 65, a central processing unit (CPU) 66, a communication interface (I/F) 67, and an external I/F 68 that are connected to each other via a bus B.

The input device 61 includes, for example, a keyboard, a mouse, and/or a touch panel, and is used by a user to input instructions (or operation signals). The display 62 displays, for example, processing results of the computer system 2.

The RAM 63 is a volatile semiconductor memory (storage device) for temporarily storing programs and data. The ROM 64 is a non-volatile semiconductor memory (storage device) that can retain programs and data even when power is turned off. For example, the ROM 64 stores programs and data such as a basic input/output system (BIOS) that is executed when the computer system 2 is turned on, operating system (OS) settings, and network settings.

The HDD 65 is a non-volatile storage device for storing various programs and data. For example, the HDD 65 may store basic software or an operating system (OS) for controlling the entire computer system 2, and application software for providing various functions on the OS.

The HDD 65 may manage the stored programs and data using a file system and/or a database (DB). Instead of the HDD 65, the computer system 2 may include a solid state drive (SSD).

The CPU (processor) 66 loads programs and data from storage devices such as the ROM 64 and the HDD 65 into the RAM 63, and executes the loaded programs to control the computer system 2 and to implement various functions of the computer system 2.

The communication I/F 67 is an interface for connecting the computer system 2 to a network. The computer system 2 can perform data communications via the communication I/F 67.

The external I/F 68 is an interface between the computer system 2 and an external storage such as a recording medium (storage medium) 68A. The computer system 2 can read and write data from and to the recording medium 68A via the external I/F 68.

The recording medium 68A may be implemented by, for example, a flexible disk, a compact disk (CD), a digital versatile disk (DVD), a secure digital (SD) memory card, or a universal serial bus (USB) memory.

With the hardware configuration of the computer system 2, each of the file server 10, the relay server 11, and the chat server 12 can perform various processes described later. Also, execution programs may be installed in the computer system 2 with the above hardware configuration so that various processes described later can be achieved through collaborations between hardware and software resources.

<Hardware Configuration of Smart Device>

FIG. 7 is a block diagram illustrating an exemplary hardware configuration of the smart device 13. As illustrated by FIG. 7, the smart device 13 may include a CPU 71, a ROM 72, a RAM 73, an electrically erasable programmable read-only memory (EEPROM) 74, a complementary metal-oxide semiconductor (CMOS) sensor 75, acceleration and orientation sensors 76, and a media drive 77.

The smart device 13 may also include an audio input 79, an audio output 80, an antenna 81, a communication interface 82, a wireless LAN interface 83, a near-field communication antenna 84, a near-field communication interface 85, a display 86, a touch panel 87, a battery 88, and a bus line 89.

The CPU 71 controls entire operations of the smart device 13. The ROM 72 stores a basic input-output program. The RAM 73 is used as a work area for the CPU 71. The EEPROM 74 reads and writes data under the control of the CPU 71. The CMOS sensor 75 captures an image of an object and obtains image data under the control of the CPU 71. The CMOS sensor 75 converts light into electric charges to obtain an electronic image of an object. Also, any other sensor, such as a charge-coupled device (CCD) sensor, that can capture an image of an object may be used instead of the CMOS sensor 75.

The acceleration and orientation sensors 76 may include an electromagnetic compass for detecting geomagnetism, a gyrocompass, and an acceleration sensor. The media drive 77 controls reading and writing (or storing) of data from and to a recording medium (storage medium) 78 such as a flash memory. The recording medium 78 is attachable to and detachable from the media drive 77. Data stored in the recording medium 78 can be read by the media drive 77, and new data can be stored in the recording medium 78 by the media drive 77.

The EEPROM 74 stores, for example, an operating system (OS) that is executed by the CPU 11 and association information that is necessary for network settings. Application programs executed by the smart device 13 to perform various processes described later may be stored in the EEPROM 74 and/or the recording medium 78.

The audio input 79 converts sounds into audio signals. The audio input 79 includes a microphone for inputting sounds. The audio output 80 converts audio signals into sounds. The audio output 80 includes a speaker for outputting sounds.

The communication interface 82 communicates via a radio signal with a nearby base station using the antenna 81. The wireless LAN interface 83 performs wireless LAN communications with an access point according to the IEEE 804.11 standard. The near-field communication interface 85 performs near-field communications (e.g., Bluetooth (registered trademark) communications) using the near-field communication antenna 84.

The display 86 may be implemented by, for example, a liquid-crystal display or an organic electroluminescence (EL) display, and displays information such as object images and icons. The touch panel 87 is provided on the display 86 and may be implemented by a pressure-sensitive touch panel or an electrostatic touch panel. When touched by, for example, a finger or a touch pen, the touch panel 87 detects a touched position on the display 86. The smart device 13 may be powered by, for example, a dedicated battery 88. The bus line 89 is, for example, an address bus and/or a data bus for electrically connecting the hardware components described above.

With the hardware configuration described above, the smart device 13 can perform various processes described later.

<Data Tables>

FIGS. 8A and 8B are exemplary data tables stored in the chat server 12. FIG. 8A is an example of a group management table, and FIG. 8B is an example of a message management table.

As illustrated by FIG. 8A, the group management table may include a "group ID" field, a "user name" field, and a "rights" field. The "group ID" field contains a group ID for identifying a chat group. The "user name" field contains a user identifier for identifying a user. The "user name" field may instead contain information for identifying the smart device 13 being used by a user. The "rights" field contains a right (e.g., presenter or listener) given to a user in a group. Types of rights are not limited to those shown in FIG. 8A.

In the example of FIG. 8A, users A through C belong to a group with a group ID "0001", the user A has a "presenter" right, and the users B and C have a "listener" right. The group management table of FIG. 8A is managed by the group manager 41. The group manager 41 generates a group management table when a group is generated by a user, and updates the group management table when a user joins an existing group.

For example, when the user A generates a group with a group ID "0001" (which is hereafter referred to as a "group 0001") for a presentation, "presenter" is set as the right of the user A. When the users B and C join the group 0001, "listener" is set as the right of the users B and C. When the users A through C are already in the group 0001 and the right of user B is changed to "presenter", "listener" is set as the right of the users A and C. Rights of users can be changed, for example, before a presentation is started or a question-and-answer session is started.

As illustrated by FIG. 8B, the message management table may include a "message ID" field, a "speaker" field, a "destination" field, a "group ID" field, a "page" field, and a "message" field. The "message ID" field contains an message ID for identifying a chat message. The "speaker" field contains a user identifier for identifying a user who is the sender of message. The "destination" field contains a user identifier for identifying a user who is the destination of a message. Each of the "speaker" field and the "destination" field may instead contain information for identifying the smart device 13 being used by the corresponding user.

The "group ID" field contains a group ID for identifying a chat group and corresponds to the "group ID" field in FIG. 8A. The "page" field contains a page number of a page corresponding to a message. The "message" field contains a message generated by the chat generator 45 for the corresponding destination.

In FIG. 8, it is assumed that the user A has the "presenter" right, and each of the users B and C has the "listener" right. In the example of FIG. 8, a record (or row) with a message ID "2" contains a question message sent from the user C (listener) to the user A (presenter). This record indicates that the question message "Could you tell me the reason why . . . ?" is related to page 5 of an electronic file being shared and displayed by the smart devices 13.

Records with message IDs "3" and "4" contain, respectively, a confirmation message and an answer message sent from the user A (presenter) to the users B and C (listeners). The record with the message ID "3" contains a confirmation message destined for the user B who is not a questioner. The confirmation message includes a message "Answering question from user C" and the question message of the user C. The record with the message ID "4" contains an answer message "Let me answer question from user C" destined for the user C who is the questioner and knows the question message.

Instead of sending different messages to the listeners (the users B and C), the same message may be sent to all of the listeners. The message management table of FIG. 8B may be generated, for example, by the chat generator 45.

Based on the above configurations of the information processing system 1 various embodiments of the present invention are described below.

<<First Embodiment>>

<Question-and-Answer Process>

FIG. 9 is a sequence chart illustrating an exemplary preparation process and an exemplary question-and-answer process according to a first embodiment. The processes illustrated by FIG. 9 are performed by the smart devices 13A through 13C, the chat server 12, and the file server 10.

In the example of FIG. 9, it is assumed that the smart device 13A is used by the user A, the smart device 13B is used by the user B, and the smart device 13C is used by the user C. Also, in the processes of FIG. 9, the relay server 11 is omitted. When the file server 10, the chat server 12, and the smart devices 13 are not in a closed network environment such as an intranet, the chat server 12 and the smart devices 13 communicate with the file server 10 via the relay server 11.

In the preparation process of FIG. 9, the smart device 13A sends a group generation request to the chat server 12 according to an operation performed by the user A (S10). When receiving the group generation request, the chat server 12 generates a group for a chat (S11).

Also, the chat server 12 gives a "presenter" right to the user A who has sent the group generation request (S12), and sends right information indicating the "presenter" right to the smart device 13A (S13).

The smart device 13B sends a log-in request for logging into the group to the chat server 12 according to an operation performed by the user B (S14). The chat server 12 gives a "listener" right to the user B who has sent the log-in request (S15), and sends right information indicating the "listener" right to the smart device 13B (S16).

The smart device 13C sends a log-in request for logging into the group to the chat server 12 according to an operation performed by the user C (S17). The chat server 12 gives the "listener" right to the user C who has sent the log-in request (S18), and sends right information indicating the "listener" right to the smart device 13C (S19). The rights of the users A through C can be changed, for example, before a presentation is started or a question-and-answer session is started.

Next, the smart device 13A sends a file list request to the file server 10 to obtain a file list of files stored in the file server 10 (S20). The smart device 13A receives the file list from the file server 10 (S21). When a file (e.g., a presentation material) is selected by the user A from the file list, the smart device 13A sends a file request to the file server 10 to obtain the selected file (S22). The file request sent to the file server 10 at step S22 may include a path (storage location) of the selected file and a user name (user A).

When the selected file is obtained from the file server 10 (S23), the file display unit 55 of the smart device 13A displays the obtained file on a file display screen (S24). At the timing when the file is displayed, the chat display unit 56 of the smart device 13A displays a chat screen corresponding to the "presenter" right indicated by the right information sent from the chat server 12 at step S13.

When a report (which, for example, includes a path and a user name) indicating that the file request has been received is received from the file server 10 (S25), the chat server 12 searches for a group based on, for example, the user name (S26).

The chat server 12 refers to the group found at step S26, and determines whether the "presenter" right is given to the user name reported from the file server 10. When the "presenter" right is given to the user name, the chat server 12 sends file information (e.g., a file path or a file link) to users with the "listener" right in the group. In the example of FIG. 9, the chat server 12 sends the file information to the smart devices 13B and 13C (S27, S28).

The smart devices 13B and 13C obtain a file based on the file information. In each of the smart devices 13B and 13C, the file display unit 55 displays the obtained file on a file display screen, and the chat display unit 56 displays a chat screen corresponding to the "listener" right indicated by the right information sent from the chat server 12.

Alternatively, the file may be "pushed" from the file server 10 to cause the smart devices 13B and 13C to display the file. By the preparation process described above, a selected file and a chat screen corresponding to the right of the user is displayed on each of the smart devices 13.

In the exemplary question-and-answer process of FIG. 9, it is assumed that after a presentation is started by the user A (presenter), the user B (listener) intends to ask a question about a topic described in page 3 of a presentation material, but the user A has already moved on to another topic in page 5 of the presentation material.

When a question message is entered by the user B on the chat screen displayed by the chat display unit 56, the smart device 13B sends the question message to the chat server 12 together with page information of the file being displayed on the file display screen (S30).

The chat server 12 determines the right of the sender (user B) of the question message, and determines a destination smart device 13 to which the question message is to be sent (S31). In the example of FIG. 9, the chat server 12 determines that the right of the sender of the question message is "listener", and determines the presenter (user A) as the destination of the question message.

The chat server 12 stores the question message received from the smart device 13B (S32), and sends a message adapted for the destination smart device 13A (S33). At step S33, the message is preferably sent together with the page information of the file.

The smart device 13A displays, on the chat screen, the message and the page information of the file received from the chat server 12, and a page of the file corresponding to the page information. As described above, the "presenter" right is given to the smart device 13A. Therefore, when a message is received from a listener, an answer button is also displayed on the chat screen of the smart device 13A. The answer button is used to report, to the chat server 12, an intention to answer a question in the message. As a non-limiting example, the answer button may be displayed for each message from a listener.

When the answer button displayed on the chat screen is pressed, the smart device 13A memorizes page information of the file being displayed on the file display screen (S35). The smart device 13A sends, to the chat server 12, a report message (answer notice) indicating an intention to answer the question together with the page information of the file (S36).

The chat server 12 searches the group based on the answer notice received from the smart device 13A (S37). The chat server 12 determines a question message corresponding to the answer notice, and sends the question message and the page information of the file to listeners (user C) other than the listener (user B) who asked the question (S38). Because the user B who asked the question naturally knows the question, the chat server 12 does not have to send the question message and the page information to the user B. Also, the chat server 12 may be configured to send, to the user B, a message (answer message) indicating that the presenter will answer the question.

The smart device 13A sends, to the file server 10, the answer notice corresponding to the question message together with page information of the file used to answer the question (S39). The file server 10 sends the page information to the chat server 12 (S40).

The chat server 12 sends the page information received from the file server 10 to the smart devices 13A through 13C (S41-S43). Then, each of the smart devices 13A through 13C displays a page of the file based on the page information (S44-S46). On the other hand, the file server 10 stores a log of the chat performed in the above process in the chat logs 10-2.

With the question-and-answer process described above, a user acting as a presenter can know questions asked by users acting as listeners and answer the questions as necessary, by using the smart device 13. The question-and-answer process described above also allows listeners other than the questioner to know who asked what types of questions by using the smart devices 13.

<Processes Performed by Chat Server>

Figure 10A:
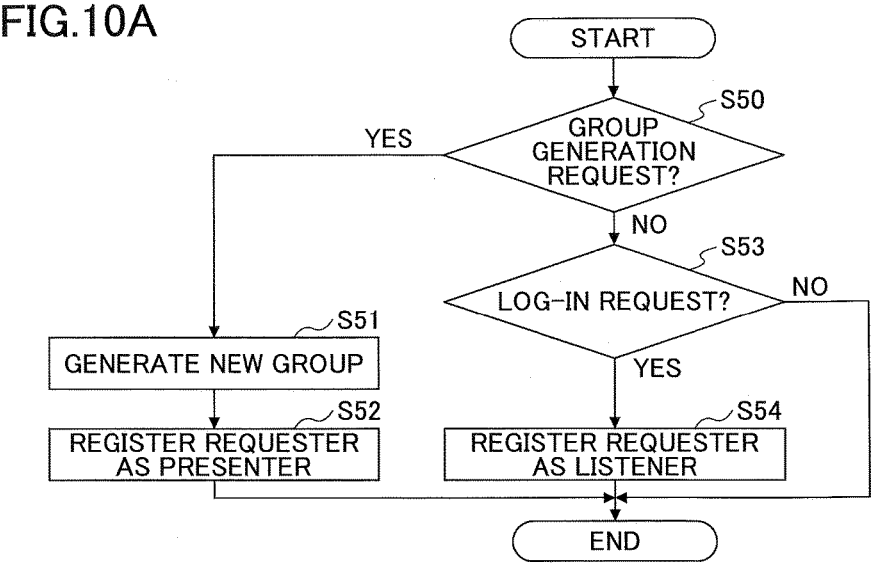
FIGS. 10A and 10B are flowcharts illustrating exemplary processes performed by a chat server.
Figure 10B:
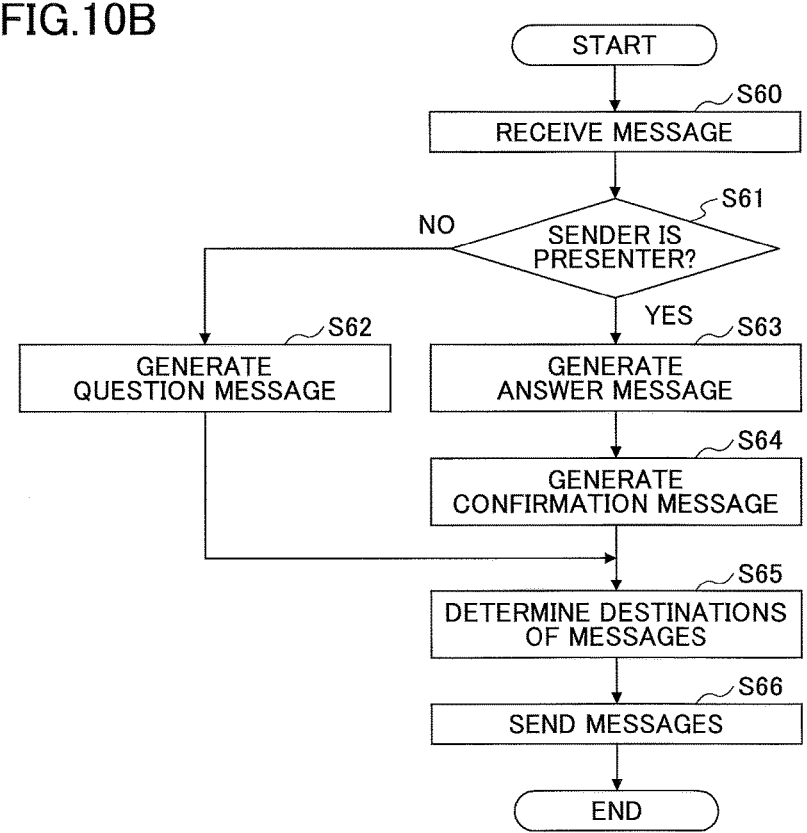

FIGS. 10A and 10B are flowcharts illustrating exemplary processes performed by the chat server 12. FIG. 10A is a flowchart illustrating a right setting process for a group, and FIG. 10B is a flowchart illustrating a question-and-answer process.

As illustrated by FIG. 10A, when a request from a smart device 13 is received by the data transceiver 43, the group manager 41 of the chat server 12 determines whether the received request is a group generation request (S50).

When the received request is a group generation request (YES at S50), the group manager 41 generates a new group (S51). A new group is, but not limited to, a chat group. Next, the group manager 41 registers a user of the smart device 13 that has sent the group generation request as a presenter (i.e., gives the "presenter" right to the user) (S52).

When the received request is not a group generation request (NO at S50), the group manager 41 determines whether the request is a log-in request (S53). When the received request is a log-in request (YES at S53), the group manager 41 registers the user of the smart device 13 that has sent the log-in request as a listener (i.e., gives the "listener" right to the user) (S54).

When the received request is not a log-in request (NO at S53), the group manager 41 ends the process.

Based on the above right setting process, the group manager 41 generates a group management table as exemplified by FIG. 8A.

As illustrated by FIG. 10B, when a message is received from a smart device 13 (S60), the destination determiner 42 of the chat server 12 refers to the "rights" field of the group management table, and determines whether the sender of the message is a presenter (S61).

When the sender is not a presenter (NO at S61), the destination determiner 42 determines that the sender is a listener, and the chat generator 45 of the chat server 12 generates a question message for the presenter (S62).

When the sender is a presenter (YES at S61), the destination determiner 42 determines a listener (questioner) who sent a question (message) corresponding to the received message, and the chat generator 45 generates an answer message for the questioner (S63). Next, the chat generator 45 generates a confirmation message for one or more listeners other than the questioner (S64).

Next, the destination determiner 42 of the chat server 12 determines users (destinations) to which the messages generated by the chat generator 45 are to be sent (S65). Through the above process, the chat generator 45 generates a message management table as exemplified by FIG. 8B.

Next, the data transceiver 43 of the chat server 12 sends the generated messages to the destinations determined at step S65 (S66), and ends the process.

At step S62 described above, the chat generator 45 may also generate a broadcast message for listeners other than the sender to report to the listeners the content of the message sent from the sender.

This enables the listeners to quickly know the content of a question message sent to the presenter before an answer is sent from the presenter. In other words, the listeners can quickly know questions asked to the presenter.

<Exemplary Screens Displayed on Smart Devices>
[Screens Displayed after Log-In]

FIGS. 11A through 11C are drawings illustrating exemplary screens displayed on the smart devices 13 after log-in. FIG. 11A illustrates an exemplary screen displayed on the smart device 13A of the user A having the "presenter" right. FIGS. 11B and 11C illustrate exemplary screens displayed on the smart devices 13B and 13C of the users B and C having the "listener" right.

Each of the screens illustrated by FIGS. 11A through 11C includes a chat screen 90 for chatting in a group and a file display screen 91 for displaying a shared electronic file. The chat screen 90 and the file display screen 91 may be generated by the same application.

As illustrated by FIG. 11A, the screen displayed on the smart device 13A of the user A (presenter) includes a chat screen 90-1 for the presenter and a file display screen 91-1 for displaying a shared file.

The chat screen 90-1 of the presenter is configured such that questions (messages) from all listeners are displayed, and a message input box for entering a chat message is not displayed.

As illustrated by FIGS. 11B and 11C, each of the screens displayed on the smart devices 13B and 13C of the users B and C (listeners) includes a chat screen 90-2 for the listener and a file display screen 91-2.

The chat screen 90-2 includes a screen 90-2A where a question (message) entered by its own user, a question to be answered by the presenter, and questions from other listeners are displayed together with user information of questioners and answerers; and a message input box 90-2B for entering a chat message such as a question to the presenter.

With the configuration of the first embodiment, as illustrated by FIGS. 11A through 11C, it is possible to display an electronic file being shared by the smart devices 13 on the file display screen 91 and to display contents corresponding to the right of the user on the chat screen 90.

[Screens Displayed after Questions are Input]

Figure 12A:
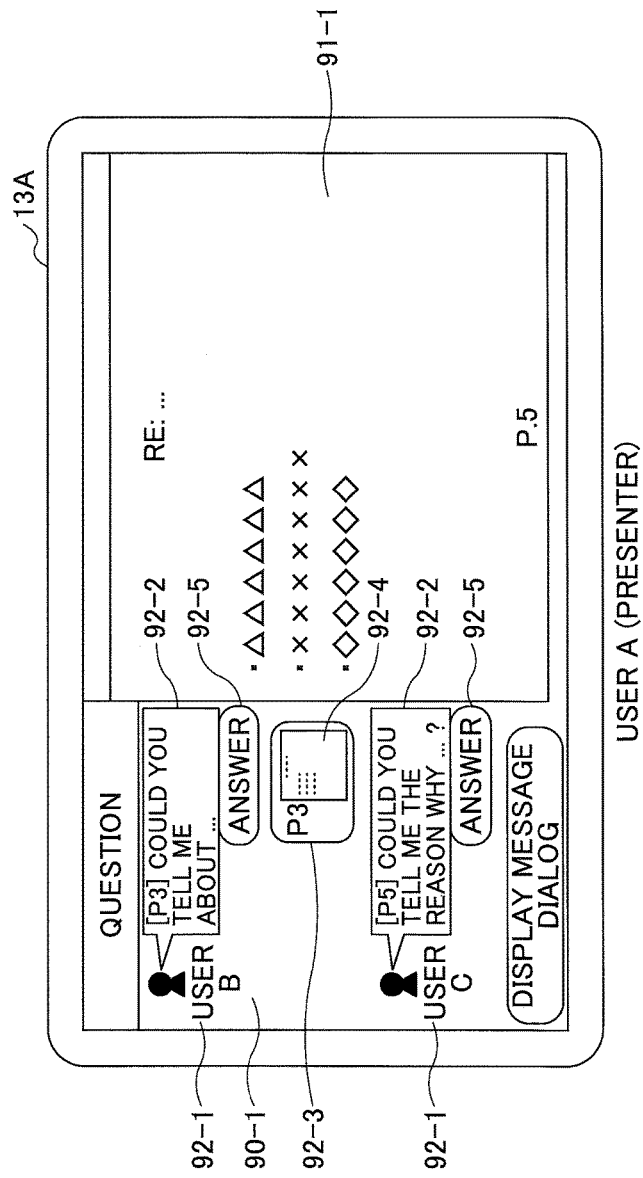

FIGS. 12A through 12C are drawings illustrating exemplary screens displayed on the smart devices 13 after questions are input. FIG. 12A illustrates an exemplary screen displayed on the smart device 13A of the user A having the "presenter" right. FIGS. 12B and 12C illustrate exemplary screens displayed on the smart devices 13B and 13C of the users B and C having the "listener" right. For example, the rights may be set by the user A and notified by the chat server 12 to the respective users.

In this example, it is assumed that during a presentation of the user A (presenter), the user B enters a question in the message input box 90-2B as illustrated in FIG. 12B, and the user C enters a question in the message input box 90-2B as illustrated in FIG. 12C. On the screen 90-2A of each of the smart devices 13B and 13C, a question (message) 92-2 entered by its own user (user B or C) is displayed together with user information 92-1 of the user.

On the other hand, after the listeners (users B and C) asked questions to the presenter (user A), question messages from the listeners are displayed on the chat screen 90-1 of the presenter as illustrated in FIG. 12A. In the example of FIG. 12A, for the user B, the user information 92-1, the question 92-2, information 92-3 indicating a page related to the question 92-2, and an image (thumbnail image) 92-4 of the page are displayed on the chat screen 90-1.

Also, for the user C who asked a question after the user B, the user information 92-1 and the question 92-2 are displayed on the chat screen 90-1. In the example of FIG. 12A, information 92-3 indicating a page related to the question 92-2 and an image 92-4 of the page are not displayed on the chat screen 90-1. This is because a page that is the same as the page displayed on the file display screen 91-2 of the user C (questioner) is displayed on the file display screen 91-1 of the presenter.

Also, each question 92-2 displayed on the file display screen 91-1 includes page information indicating a page related to the question 92-2. With the page information displayed together with the corresponding question, the presenter can easily determine a page related to the question.

Thus, as illustrated by FIG. 12A, the configuration of the first embodiment makes it possible to display all questions asked by questioners on the smart device 13A of the presenter (answerer). Also, when a broadcast message as described above is used, it is possible to display a message sent by another listener on each of the smart devices 13B and 13C illustrated by FIGS. 12B and 12C.

Also in the chat screen 90-1 of the presenter illustrated in FIG. 12A, an answer button 92-5 is displayed for each of the questions 92-2 of the users B and C. The presenter can send an answer notice for the question 92-2 to the corresponding one of the smart devices 13B and 13C of the listeners by pressing the answer button 92-5. In the first embodiment, however, the function to answer a question is not essential as long as questions can be displayed on the smart devices 13.

As described above, the chat screen 90-1 of the presenter displays questions from listeners, and the chat screen 90-2 of a listener displays a question entered by the listener itself. Thus, the first embodiment makes it possible to configure a screen of the smart device 13 according to the right of a user and depending on whether questions are entered.

[Screens Displayed after Answer Notice is Sent]

Figure 13C:
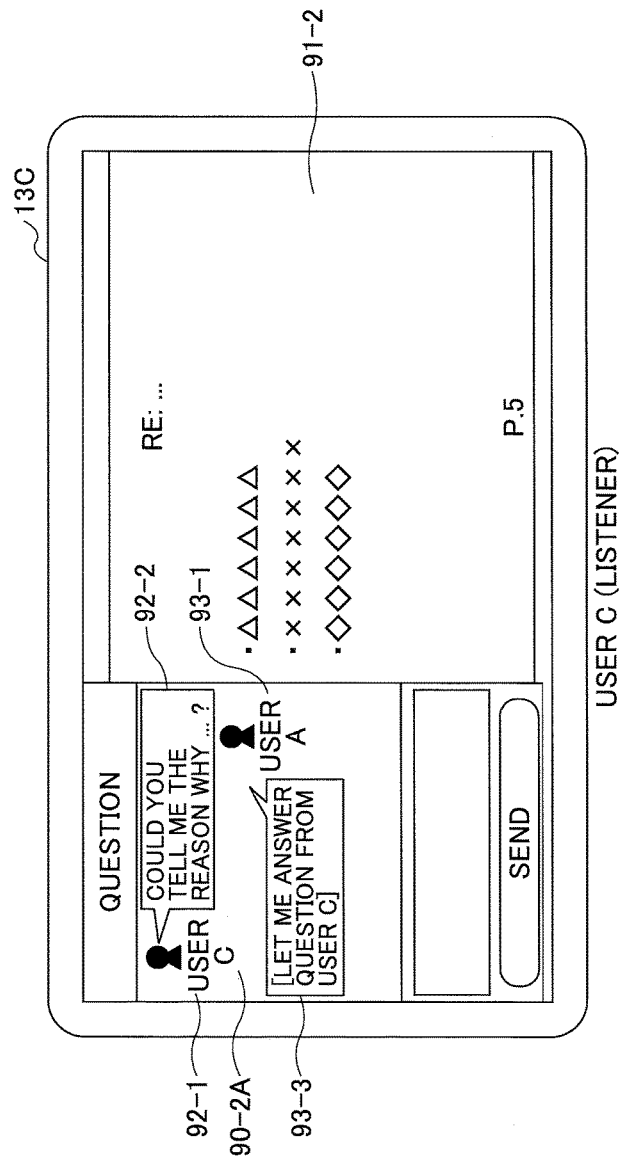

FIGS. 13A through 13C are drawings illustrating exemplary screens displayed on the smart devices 13 after an answer notice is sent. FIG. 13A illustrates an exemplary screen displayed on the smart device 13A of the user A having the "presenter" right. FIGS. 13B and 13C illustrate exemplary screens displayed on the smart devices 13B and 13C of the users B and C having the "listener" right.

As illustrated by FIG. 13A, when the answer button 92-5 for the question 92-2 of the user C is pressed on the chat screen 90-1 of the presenter, an answer notice is sent to each of the smart devices 13B and 13C of the listeners.

Each of FIGS. 13B and 13C illustrates the chat screen 90-2A of a listener which is displayed after the answer notice is sent from the smart device 13A. When the answer notice for the question of the user C is received, the chat screen 90-2A of the user B illustrated in FIG. 13B displays the user information 93-1 of the user A (presenter), and information 93-2 that includes the question of the user C (questioner) and a message indicating that the question of the user C is to be answered. The information 93-2 is an example of a confirmation message sent to a listener who is not questioner.

The chat screen 90-2A of the user C illustrated in FIG. 13C displays the user information 93-1 of the user A (presenter), and information 93-3 that includes a message indicating that the question of the user C is to be answered. The information 93-3 is an example of an answer message sent to a questioner. In the example of FIG. 13C, the information 93-3 includes only the message indicating that the question of the user C is to be answered, and does not include the question of the user C. This is because the question has been entered by the user C itself and is already displayed on the chat screen 90-2A.

As described above, in the first embodiment, when a presenter presses an answer button assigned to one of questions, a report message indicating that the question is to be answered is sent to listeners. When, for example, a question of the user C is to be answered, a message including the questioner (user C) of the question, the question itself, and information indicating that the question is to be answered is sent to the user B, and a message including only the information indicating that the question is to be answered is sent to the user C.

Thus, according to the first embodiment, information including a questioner of a question and the question itself is sent to listeners other than the questioner. This configuration enables a listener to know questions and answers exchanged between other listeners and a presenter.

<<Second Embodiment>>

Next, a second embodiment is described. In the second embodiment, when a presenter answers a question, the answer is also displayed on a chat screen. The system configuration and the functional and hardware configurations of apparatuses in the second embodiment are substantially the same as those in the first embodiment. Therefore, their descriptions are omitted here. Below, differences between the first and second embodiments are mainly discussed.

Figure 14:
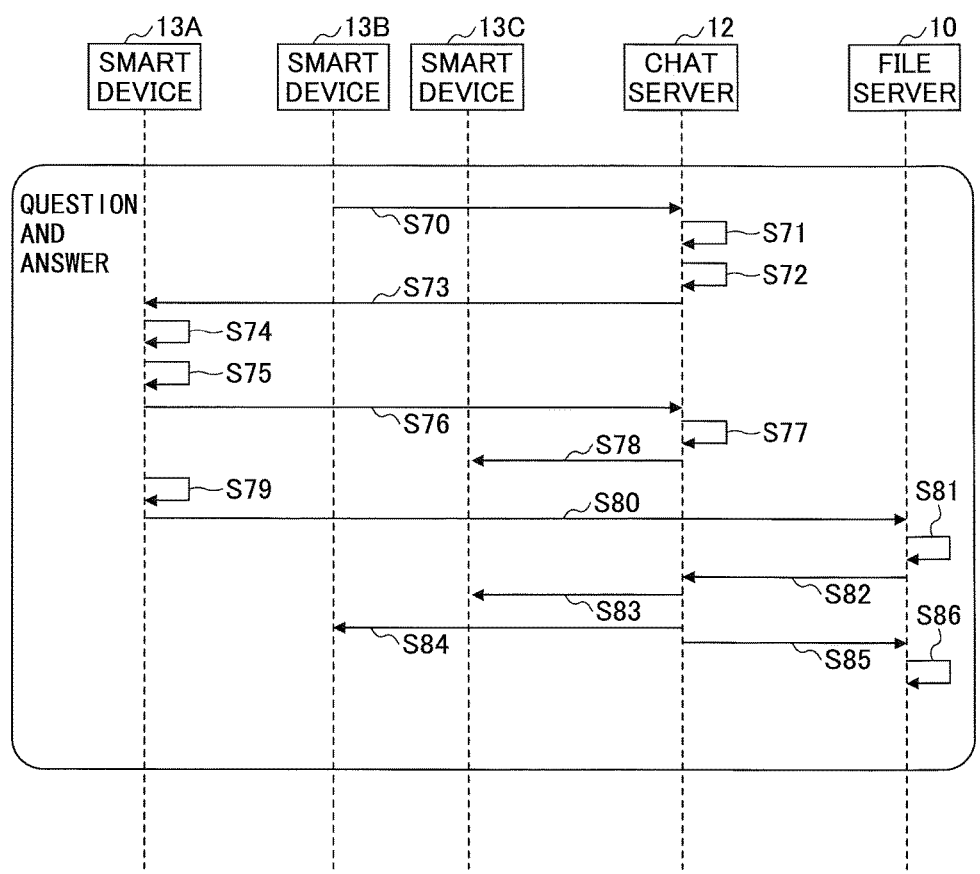
FIG. 14 is a sequence chart illustrating an exemplary question-and-answer process according to a second embodiment.

FIG. 14 is a sequence chart illustrating an exemplary question-and-answer process according to the second embodiment. In the question-and-answer process of the first embodiment described with reference to FIG. 9, it is assumed that the presenter (user A) orally answers the question after pressing the answer button displayed on the chat screen at step S35.

In the question-and-answer process of the second embodiment, an answer of the presenter (user A) is recorded as an audio file, the audio file is converted by the file server 10 into text information after the answer is finished, and the text information is sent (or delivered), for example, to the smart devices 13 of listeners belonging to the same group. Steps S70 through S78 of FIG. 14 are substantially the same as steps S30 through S38 of FIG. 9, and therefore descriptions of those steps are omitted.

As illustrated by FIG. 14, while the pressing of the answer button is being detected by the operation receiver 53, the smart device 13A records voice as an audio file (audio information) (S79), and sends the audio file and an answer notice to the file server 10 (S80). The file converter 22 of the file server 10 converts the audio file (audio information) received from the smart device 13A into text information (S81), and the file server 10 sends the text information as answer information to the chat server 12 (S82).

Based on the answer information received from the file server 10, the chat server 12 sends the text information as answer information to the users B and C (listeners) (S83 and S84). The chat server 12 also sends question information and the answer information (including the text information) to the file server 10 (S85).

Using the question information and the answer information (including the text information) received from the chat server 12, the file server 10 outputs a file (S86). Through the above process, the file server 10 can also generate simple minutes based on the question information and the answer information.

As described above, the second embodiment makes it possible to easily and speedily send answers (answer messages) to questions to listeners without requiring the presenter to manually enter answer messages.

<<Third Embodiment>>

In the first and second embodiments, it is assumed that the information processing system 1 is used for a presentation. However, the information processing system 1 may also be used for various purposes such as job training and teaching at a school. Also, an information totalization function may be provided in, for example, the chat server 12 to obtain statistical data based on answers made in a chat, and information may be provided based on the statistical data from the chat server 12 or the file server 10 to the smart devices 13. These variations of the first and second embodiments are described below as a third embodiment.

The system configuration and the functional and hardware configurations of apparatuses in the third embodiment are substantially the same as those in the first and second embodiments, except that the chat server 12 additionally includes an information totalization function. Differences between the third embodiment and the first and second embodiments are mainly discussed below.

<Functional Configuration of Chat Server>

Figure 15:
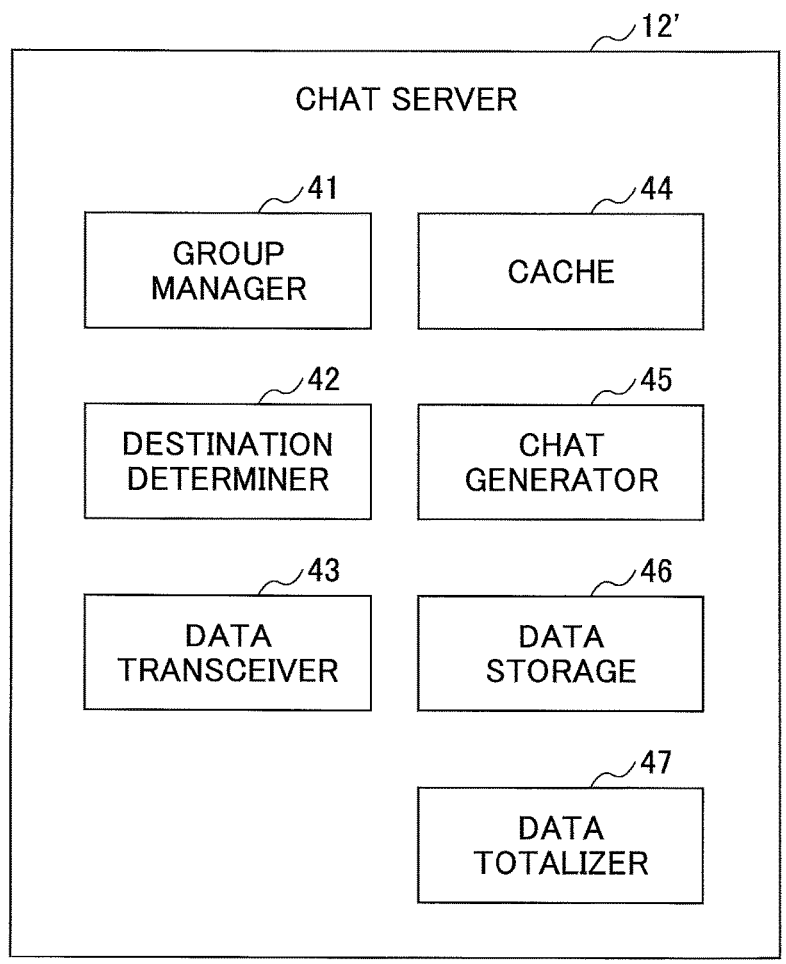
FIG. 15 is a block diagram illustrating an exemplary functional configuration of a chat server according to a third embodiment.

FIG. 15 is a block diagram illustrating an exemplary functional configuration of a chat server 12' according to the third embodiment. As illustrated by FIG. 15, the chat server 12' includes a group manager 41, a destination determiner 42, a data transceiver 43, a cache 44, a chat generator 45, a data storage 46, and a data totalizer 47.

The group manager 41, the destination determiner 42, the data transceiver 43, the cache 44, the chat generator 45, the data storage 46, and the data totalizer 47 may be implemented by executing a program by a processor of the chat server 12'.

Compared with the chat server 12 of the first and second embodiments, the chat server 12' of the third embodiment additionally includes the data totalizer 47.

The data totalizer 47 obtains statistical data based on answers made in a chat. For example, the data totalizer 47 compares answers made by students (users) in a chat with predefined answers associated with page numbers of an electronic file being shared and displayed, and calculates the number of correct answers and the number of incorrect answers of the students (statistical data). The statistical data is reported to a lecturer (user) to enable the lecturer to determine the level of understanding of the students. The statistical data obtained by the data totalizer 47 may be stored in the chat logs 10-2 of the file server 10.

The third embodiment also enables a lecturer to automatically assign homework to students based on the statistical data. For example, when the lecturer sends a request to assign homework to the students based on the statistical data, the file server 10 retrieves homework data (questions) registered in association with relevant pages of the electronic file, and sends the retrieved homework data to students whose rating (e.g., the number of correct answers) based on the statistical data is less than or equal to a threshold. Also, different sets of homework data may be sent to students based on their levels of understanding determined based on the statistical data.

<Information Totalization Process>

Figure 16:
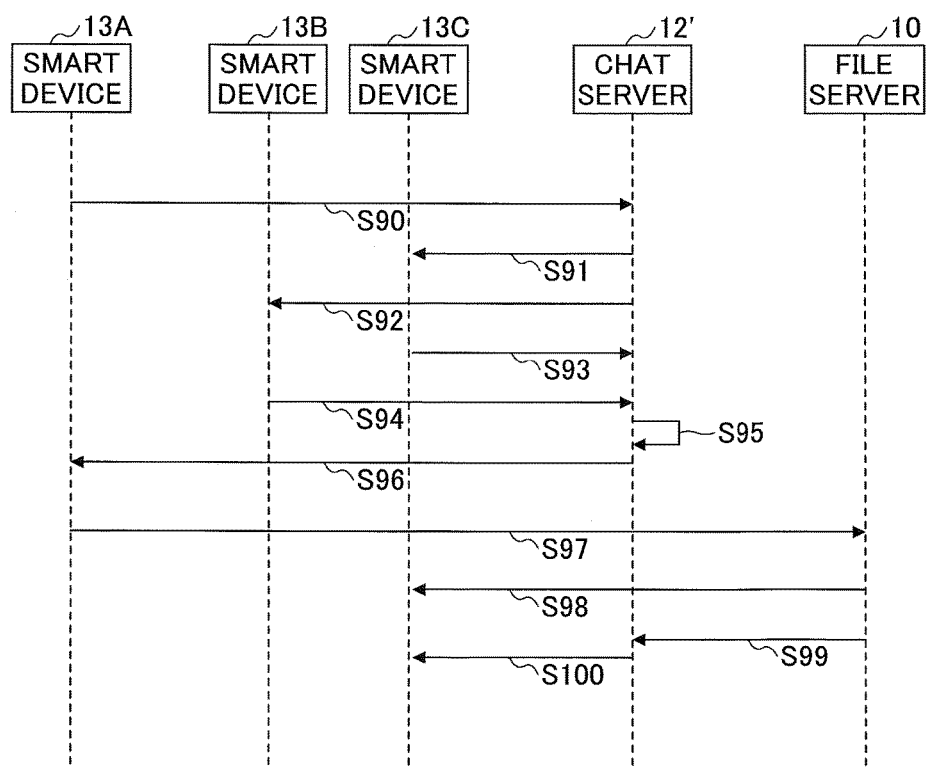
FIG. 16 is a sequence chart illustrating an exemplary information totalization process according to the third embodiment.

FIG. 16 is a sequence chart illustrating an exemplary information totalization process according to the third embodiment. In the example of FIG. 16, the information totalization process is performed by the smart devices 13A through 13C, the chat server 12', and the file server 10. Also in the example of FIG. 16, it is assumed that the smart device 13A is used by the user A (lecturer), the smart device 13B is used by the user B (student), and the smart device 13C is used by the user C (student).

The smart device 13A sends one or more sets of question information for a lecture to the chat server 12' according to an operation performed by the user A (lecturer) (S90). Each set of question information includes a question and page information of an electronic file used in the lecture and being displayed by the smart devices 13A through 13C. The number of sets of question information sent to the chat server 12' is not limited to a specific value.

The chat server 12' sends the question information to the smart devices 13B and 13C being used by the users B and C (S91, S92). The smart devices 13B and 13C sends answers to the questions to the chat server 12' (S93, S94).

The chat server 12' obtains statistical data based on the answers received from the smart devices 13B and 13C (S95). As a non-limiting example, the statistical data may be obtained for each user (student) or each question, or may be represent an average.

Next, the chat server 12' sends the statistical data to the smart device 13A (S96). The user A (lecturer) of the smart device 13A reviews the statistical data, and sends, to the file server 10, a request to assign homework based on, for example, an accuracy rate of each student or an average accuracy rate of students (S97).

The request to assign homework may include page information of a relevant electronic file and user information of users (students) to which homework is to be assigned. When receiving the request to assign homework from the smart device 13A, the file server 10 extracts homework data corresponding to the page information in the request, and delivers the homework data (document(s)) to the corresponding user(s) (S98). In the example of FIG. 16, it is assumed that the accuracy rate of the user C is less than a threshold, and homework data is delivered only to the smart device 13C of the user C.

The file server 10 also sends, to the chat server 12', information indicating that the homework data (document) has been delivered (S99). The chat server 12', for example, generates information (or a message) to be displayed on the chat screen and indicating that the homework data has been delivered, and sends the generated information to the smart device 13C (S100).

Information sent and received by the chat server 12' is stored, for example, in the chat logs 10-2 in association with time information. When the statistical data sent at step S96 indicates that the accuracy rates of all the students are greater than or equal to the threshold, the user A does not send the request to assign homework and therefore the process ends without performing step S97 and subsequent steps.

As described above, the third embodiment makes it possible to automatically obtain statistical data of answers made by students in response to questions from a lecturer, and to send document files (e.g., for homework) to students whose level of understanding is low.

An aspect of this disclosure provides a system where a file shared by users and messages are simultaneously displayed on a terminal of each of the users, makes it possible to display different messages on the terminal of a presenter and the terminal of a listener, and thereby makes it possible to smoothly perform interactive communications.

An information processing system, an information processing apparatus, and a storage medium according to embodiments of the present invention are described above. However, the present invention is not limited to the specifically disclosed embodiments, and variations and modifications may be made without departing from the scope of the present invention.

What is claimed is:

1. An information processing system, comprising:
   an information processing apparatus; and
   terminals connected to the information processing apparatus, wherein
   the information processing apparatus includes a first processor programed to execute a first process including
      storing right information for each of users of the terminals in a storage device,
      determining a right of a user of a sender terminal of the terminals that has sent a message based on the right information stored in the storage device,
      determining at least one destination terminal of the terminals based on the right of the user of the sender terminal,
      generating one of a question message and a response message adapted for the destination terminal based on the message sent from the sender terminal and the right of the user of the sender terminal, and
      sending the generated one of the question message and the response message to the destination terminal;
   each of the terminals includes a second processor programmed to execute a second process including
      when receiving, as the destination terminal, the one of the question message and the response message, displaying the received one of the question message and the response message in a display format corresponding to a right of the destination terminal; and in the first process,
when the sender terminal is a questioner terminal having a right of a questioner, an answerer terminal having a right of an answerer is determined as the destination terminal,
when the sender terminal is the answerer terminal,
each of other terminals belonging to a same group as the answerer terminal is determined as the destination terminal,
the response message indicating that the answerer will answer a question from the questioner is generated for the questioner terminal, and
a confirmation message including the question message indicating the question from the questioner and the response message is generated for each of other terminals belonging to the same group as the questioner terminal and the answerer terminal.

2. The information processing system as claimed in claim 1, wherein in the second process, the one of the question message and the response message sent from the information processing apparatus and a shared file shared by the terminals are displayed on a same screen.

3. The information processing system as claimed in claim 1, wherein the one of the question message and the response message sent from the information processing apparatus includes page information indicating a page of a shared file viewed by the questioner.

4. The information processing system as claimed in claim 1, wherein in the sending, text data obtained by converting audio data input at the sender terminal is sent to the destination terminal.

5. The information processing system as claimed in claim 1, wherein the first process further includes
generating minutes based on questions from the questioner and answers from the answerer.

6. The information processing system as claimed in claim 1, wherein the first process further includes
obtaining statistical data based on messages sent from the terminals, and
sending files to the terminals based on the statistical data.

7. The information processing system as claimed in claim 1, wherein the right of the sender terminal and the right of the destination terminal are changeable.

8. The information processing system as claimed in claim 1, wherein the first processor determines whether the right of the user of the sender terminal is the answerer or the questioner.

9. An information processing apparatus connected to terminals, the information processing apparatus comprising:
a processor programed to execute a process including
storing right information for each of users of the terminals in a storage device,
determining a right of a user of a sender terminal of the terminals that has sent a message based on the right information stored in the storage device,
determining at least one destination terminal of the terminals based on the right of the user of the sender terminal,
generating one of a question message and a response message adapted for the destination terminal based on the message sent from the sender terminal and the right of the user of the sender terminal, and
sending the generated one of the question message and the response message to the destination terminal,
wherein in the process,
when the sender terminal is a questioner terminal having a right of a questioner, an answerer terminal having a right of an answerer is determined as the destination terminal,
when the sender terminal is the answerer terminal,
each of other terminals belonging to a same group as the answerer terminal is determined as the destination terminal,
the response message indicating that the answerer will answer a question from the questioner is generated for the questioner terminal, and
a confirmation message including the question message indicating the question from the questioner and the response message is generated for each of other terminals belonging to the same group as the questioner terminal and the answerer terminal.

10. A non-transitory computer-readable storage medium storing a program for causing a computer to execute a process, the process comprising:
storing right information for each of users of terminals in a storage device;
determining a right of a user of a sender terminal of the terminals that has sent a message based on the right information stored in the storage device;
determining at least one destination terminal of the terminals based on the right of the user of the sender terminal;
generating one of a question message and a response message adapted for the destination terminal based on the message sent from the sender terminal and the right of the user of the sender terminal; and
sending the generated one of the question message and the response message to the destination terminal,
wherein in the process,
when the sender terminal is a questioner terminal having a right of a questioner, an answerer terminal having a right of an answerer is determined as the destination terminal,
when the sender terminal is the answerer terminal,
each of other terminals belonging to a same group as the answerer terminal is determined as the destination terminal,
the response message indicating that the answerer will answer a question from the questioner is generated for the questioner terminal, and
a confirmation message including the question message indicating the question from the questioner and the response message is generated for each of other terminals belonging to the same group as the questioner terminal and the answerer terminal.

* * * * *